US012331559B2

(12) United States Patent
Mahr

(10) Patent No.: US 12,331,559 B2
(45) Date of Patent: Jun. 17, 2025

(54) VEHICLE CABIN SECURITY APPARATUS, SYSTEMS, AND METHODS

(71) Applicant: Execumahr LLC, Avon Lake, OH (US)

(72) Inventor: John Mahr, San Antonio, TX (US)

( * ) Notice: Subject to any disclaimer, the term of this patent is extended or adjusted under 35 U.S.C. 154(b) by 15 days.

(21) Appl. No.: 18/191,331

(22) Filed: Mar. 28, 2023

(65) Prior Publication Data

US 2024/0328213 A1 Oct. 3, 2024

(51) Int. Cl.

*E05B 79/06* (2014.01)
*E05B 17/00* (2006.01)
*E05B 85/16* (2014.01)

(52) U.S. Cl.

CPC .......... *E05B 79/06* (2013.01); *E05B 17/0054* (2013.01); *E05B 85/16* (2013.01)

(58) Field of Classification Search

CPC .......... E05B 85/06; E05B 85/10; E05B 85/14; E05B 85/16; E05B 85/18; E05B 79/06; E05B 9/04; E05B 9/048; E05B 13/001; E05B 17/0054; E05B 17/0058; E05B 79/02; E05B 79/04; E05B 83/36; Y10T 292/57

See application file for complete search history.

(56) References Cited

U.S. PATENT DOCUMENTS 3,704,607 A * 12/1972 Germanton ........... E05B 37/163 70/313
4,037,515 A * 7/1977 Kesselman ........... F16B 41/005 411/3
4,726,723 A * 2/1988 Bainbridge ......... F16B 23/0007 411/432

(Continued)

FOREIGN PATENT DOCUMENTS

CN 110219545 A * 9/2019 ............. E05B 15/10
EP 1094182 4/2001

(Continued)

OTHER PUBLICATIONS

[No Author Listed] [online], "2018—F250 Break in—Door Handle Fix—key lock remove," May 10, 2019, Internet Archive: Wayback Machine URL <http://web.archive.org/web/20230208184637/https://www.youtube.com/watch?v=4tTcVxoLWrA>, retrieved on Mar. 28, 2023, <https://www.youtube.com/watch?v=4tTcVxoLWrA>, 2 pages [Video Submission].

(Continued)

*Primary Examiner* — Kristina R Fulton
*Assistant Examiner* — Noah Horowitz

(57) ABSTRACT

A passenger vehicle door handle assembly includes a door lock, a panel assembly, a door handle, and a sleeve. The door lock adjusts a door of a passenger vehicle between a locked position and an unlocked position. The door lock includes a lock assembly and a lock stem. The panel assembly mounts to the door and receives at least the lock assembly of the door lock into a slotted portion of a back panel. The door handle includes a first portion configured to pivotally couple to the panel assembly at a first end of the panel assembly, and a second portion with an opening configured to receive at least the lock stem of the door lock. The sleeve fits over the lock stem and rotates about the lock stem in response to an external force or an external torque applied to the sleeve.

30 Claims, 18 Drawing Sheets

(56) References Cited

U.S. PATENT DOCUMENTS

| | | | | |
|---|---|---|---|---|
| 5,927,240 | A * | 7/1999 | Maxon | B60R 25/04 123/179.25 |
| 6,062,787 | A * | 5/2000 | Maddalena | F16B 41/005 411/432 |
| 6,382,001 | B1 * | 5/2002 | Neeley | F16K 35/06 70/178 |
| 6,622,535 | B2 * | 9/2003 | Chiang | E05B 47/0692 70/277 |
| 6,719,511 | B2 * | 4/2004 | Notaro | F16B 41/005 411/432 |
| 7,004,701 | B2 * | 2/2006 | Ross | B25B 13/485 411/405 |
| 7,090,285 | B2 | 8/2006 | Markevich et al. | |
| 7,445,414 | B1 * | 11/2008 | Notaro | F16B 23/0007 411/432 |
| 7,905,697 | B2 * | 3/2011 | Ward, Jr. | F16B 41/005 411/432 |
| 9,464,465 | B2 * | 10/2016 | Weinerman | E05B 85/16 |
| 9,972,148 | B2 | 5/2018 | Huennekens et al. | |
| 10,180,014 | B2 * | 1/2019 | Tanaka | E05B 47/0012 |
| 10,457,183 | B2 | 10/2019 | Frederick et al. | |
| 10,914,101 | B2 | 2/2021 | Ishikawa | |
| 11,085,204 | B2 | 8/2021 | Ichinose | |
| 2005/0218666 | A1 | 10/2005 | Odahara et al. | |
| 2008/0136195 | A1 | 6/2008 | Ooe et al. | |
| 2008/0217956 | A1 | 9/2008 | Gschweng et al. | |
| 2009/0039658 | A1 | 2/2009 | Spurr et al. | |
| 2014/0084603 | A1 | 3/2014 | Bejune et al. | |
| 2014/0230329 | A1 | 8/2014 | Patel | |
| 2015/0021931 | A1 | 1/2015 | Konchan et al. | |
| 2015/0337567 | A1 | 11/2015 | Puscas et al. | |
| 2016/0160540 | A1 | 6/2016 | Bejune et al. | |
| 2017/0167170 | A1 | 6/2017 | Seo et al. | |
| 2021/0324663 | A1 * | 10/2021 | Cho | E05B 85/16 |

FOREIGN PATENT DOCUMENTS

| | | | | |
|---|---|---|---|---|
| FR | 2824581 | A1 * | 11/2002 | E05B 81/06 |
| WO | WO-2016194304 | A1 * | 12/2016 | E05B 47/0012 |
| WO | WO-2023066722 | A1 * | 4/2023 | |

OTHER PUBLICATIONS

[No Author Listed] [online], “Apparently Ford Trucks Can Be Broken Into Pretty Easily,” Jun. 8, 2021, Internet Archive: Wayback Machine URL <http://web.archive.org/web/20230208183848/https://www.youtube.com/watch?v=2r9U_9NQ2qs>, retrieved on Mar. 28, 2023, URL <https://www.youtube.com/watch?v=2r9U_9NQ2qs>, 2 pages [Video Submission].

Snitkoff [online], “2019 Ford F-150 Stolen with Mind-Blowing Speed: Video,” Jan. 5, 2021, Internet Archive: Wayback Machine URL <http://web.archive.org/web/20210106132111/https://fordauthority.com/2021/01/2019-ford-f-150-stolen-with-mind-blowing-speed-video/>, retrieved Mar. 28, 2023, URL <https://fordauthority.com/2021/01/2019-ford-f-150-stolen-with-mind-blowing-speed-video/>, 6 pages.

* cited by examiner

VEHICLE CABIN SECURITY APPARATUS, SYSTEMS, AND METHODS

TECHNICAL FIELD

The present disclosure describes vehicle cabin security apparatus, systems, and methods and, more particularly, supplemental cabin security apparatus, systems, and methods for a passenger vehicle, such as a roadway passenger car, sport utility vehicle (SUV), or truck.

BACKGROUND

Passenger vehicles, such as cars, SUVs, or trucks, typically include cabin security devices to prevent or help present unwanted entry into a vehicle cabin. Such cabin security devices include, for instance, door handle locks, alarm systems, coded door entry systems, and otherwise. However, unauthorized entry into vehicle cabins can still occur.

SUMMARY

In an example implementation, a passenger vehicle door handle assembly includes a door lock configured to adjust a door of a passenger vehicle between a locked position and an unlocked position, the door lock including a lock assembly and a lock stem; a panel assembly configured to mount to the door, the panel assembly including a front panel portion and a back panel coupled to the front panel portion, the back panel including an aperture sized and configured to receive at least the lock assembly of the door lock into a slotted portion of the back panel; a door handle including a first portion configured to pivotally couple to the panel assembly at a first end of the panel assembly, and a second portion including an opening configured to receive at least the lock stem of the door lock; and a sleeve sized to fit over the lock stem and configured to rotate about the lock stem in response to an external force or an external torque applied to the sleeve.

In another example implementation, a passenger vehicle door handle assembly includes a door lock configured to adjust a door of a passenger vehicle between a locked position and an unlocked position, the door lock including a lock assembly and a lock stem; a panel assembly configured to mount to the door, the panel assembly including a front panel portion and a back panel coupled to the front panel portion, the back panel including an aperture sized and configured to receive at least the lock assembly of the door lock into a slotted portion of the back panel; a door handle including a first portion configured to pivotally couple to the panel assembly at a first end of the panel assembly, and a second portion including an opening configured to receive at least the lock stem of the door lock; and a sleeve carried on the lock stem to move about the lock stem and limit a force or a torque transmitted to the back panel through the sleeve and the lock stem to no more than a specified breaking force of the back panel.

In another example implementation, a passenger vehicle door handle assembly includes a door lock configured to adjust a door of a passenger vehicle between a locked position and an unlocked position, the door lock including a lock assembly and a lock stem; a panel assembly configured to mount to the door, the panel assembly including a front panel portion and a back panel coupled to the front panel portion, the back panel including an aperture sized and configured to receive at least the lock assembly of the door lock into a slotted portion of the back panel; a door handle including a first portion configured to pivotally couple to the panel assembly at a first end of the panel assembly, and a second portion including an opening configured to receive at least the lock stem of the door lock; and a sleeve sized to fit over at least a portion of the lock stem of the door lock and configured to move about the lock stem in response to an external force or an external torque applied to the sleeve exclusive of passing a portion of the external force or the external torque, through the lock stem, to the back panel assembly that is sufficient to break the back panel assembly.

In another example implementation, a passenger vehicle door handle assembly includes a door lock configured to adjust a door of a passenger vehicle between a locked position and an unlocked position, the door lock including a lock assembly and a lock stem; a panel assembly configured to mount to the door, the panel assembly including a front panel portion and a back panel coupled to the front panel portion, the back panel including an aperture sized and configured to receive at least the lock assembly of the door lock into a slotted portion of the back panel; a door handle including a first portion configured to pivotally couple to the panel assembly at a first end of the panel assembly, and a second portion including an opening configured to receive at least the lock stem of the door lock; and means for isolating an external force or an external torque applied and sufficient to break the back panel assembly that is transmitted through the lock stem.

In another example implementation, a passenger vehicle door handle assembly includes a door lock configured to adjust a door of a passenger vehicle between a locked position and an unlocked position, the door lock including a first part and a second part; a panel assembly configured to mount to the door, the panel assembly including a front panel portion and a back panel coupled to the front panel portion, the back panel including an aperture sized and configured to receive at least the first part of the door lock into a contoured recess of the back panel; a door handle including a first portion configured to pivotally couple to the panel assembly at a first end of the panel assembly, and a second portion including an opening configured to receive at least the second part of the door lock; and a sleeve carried on the second part to move about the second part and limit a force or a torque transmitted to the back panel through the sleeve and the second part to no more than a specified breaking force of the back panel.

In another example implementation, a passenger vehicle door handle assembly includes a door lock configured to adjust a door of a passenger vehicle between a locked position and an unlocked position, the door lock including a first part and a second part; a panel assembly configured to mount to the door, the panel assembly including a front panel portion and a back panel coupled to the front panel portion, the back panel including an aperture sized and configured to receive at least the first part of the door lock into a contoured recess of the back panel; a door handle including a first portion configured to pivotally couple to the panel assembly at a first end of the panel assembly, and a second portion including an opening configured to receive at least the second part of the door lock; and a sleeve sized to fit over at least a portion of the second part of the door lock and configured to rotate around the second part in response to an external force or an external torque applied to the sleeve exclusive of passing a portion of the external force or the external torque, through the second part, to the back panel assembly that is sufficient to break the back panel assembly.

In another example implementation, a passenger vehicle door handle assembly includes a door lock configured to adjust a door of a passenger vehicle between a locked position and an unlocked position, the door lock including a first part and a second part; a panel assembly configured to mount to the door, the panel assembly including a front panel portion and a back panel coupled to the front panel portion, the back panel including an aperture sized and configured to receive at least the first part of the door lock into a contoured recess of the back panel; a door handle including a first portion configured to pivotally couple to the panel assembly at a first end of the panel assembly, and a second portion including an opening configured to receive at least the second part of the door lock; and means for eliminating an external force or an external torque applied to, and sufficient to break, the back panel assembly through the second part of the door lock.

One, some, or all of the example implementations of a passenger vehicle door handle assembly can include one, some, or all of the following aspects, either alone or in combination.

In an aspect combinable with any of the example implementations, the sleeve is configured to rotate about the lock stem in response to the external force or the external torque applied to the sleeve without transmitting the external force or the external torque, through the lock stem, to the back panel assembly that is sufficient to break the back panel assembly.

Another aspect combinable with any of the previous aspects further includes a snap ring configured to fit over at least a portion of the door lock and maintain the sleeve at a particular position on the door lock.

In another aspect combinable with any of the previous aspects, the snap ring includes a split snap ring.

In another aspect combinable with any of the previous aspects, the snap ring is biased to engage the portion of the door lock.

In another aspect combinable with any of the previous aspects, the door lock further includes a key cylinder that extends from the lock stem.

In another aspect combinable with any of the previous aspects, the sleeve is sized to fit over the lock stem and terminate at a shoulder of the lock assembly.

In another aspect combinable with any of the previous aspects, the snap ring is configured to fit over the key cylinder and maintain the sleeve on the lock stem.

Another aspect combinable with any of the previous aspects further includes a material deposition layer applied to at least a portion of the door lock and configured to maintain the sleeve at a particular position on the lock stem.

In another aspect combinable with any of the previous aspects, the material deposition layer includes at least one of a weld deposition layer, a solder deposition layer, or a brazed deposition layer configured to maintain, when applied, the sleeve at the particular position on the lock stem.

In another aspect combinable with any of the previous aspects, the material deposition layer includes a ring applied to the door lock.

In another aspect combinable with any of the previous aspects, the door lock further includes a key cylinder that extends from the lock stem, and the sleeve is sized to fit over the lock stem and abut a shoulder of the lock assembly.

In another aspect combinable with any of the previous aspects, the material deposition layer is applied to the key cylinder and is configured to maintain the sleeve on the lock stem.

In another aspect combinable with any of the previous aspects, the material deposition layer is applied to the lock stem between the lock stem and the sleeve and is configured to adhere the sleeve to the lock stem.

In another aspect combinable with any of the previous aspects, the material deposition layer includes an adhesive material.

In another aspect combinable with any of the previous aspects, the opening of the second portion of the door handle is configured to receive at least part of the sleeve.

In another aspect combinable with any of the previous aspects, the door handle is configured to pivot at the first portion to retract the second portion away from the front panel and expose the sleeve from the opening of the second portion of the door handle without exposing the lock stem of the door lock.

In another aspect combinable with any of the previous aspects, the sleeve is a cylinder or a split cylinder In another aspect combinable with any of the previous aspects, the sleeve has a polygonal cross-section.

In another aspect combinable with any of the previous aspects, the sleeve is at least partially made from a metallic material.

In another aspect combinable with any of the previous aspects, the metallic material includes stainless steel, galvanized steel, or aluminum.

In another aspect combinable with any of the previous aspects, the door lock includes a keyed door lock.

In another aspect combinable with any of the previous aspects, the door is a driver door.

In another aspect combinable with any of the previous aspects, the passenger vehicle is a passenger truck.

In another aspect combinable with any of the previous aspects, the passenger truck is a Ford® passenger truck.

In another aspect combinable with any of the previous aspects, the Ford® passenger truck is a Ford® F-150, a Ford® F-250 or a Ford® F-350.

In another aspect combinable with any of the previous aspects, the passenger vehicle is a sports utility vehicle (SUV).

In another aspect combinable with any of the previous aspects, the SUV is a Ford® SUV.

In another aspect combinable with any of the previous aspects, the Ford® SUV is a Ford® Explorer or a Ford® Expedition.

Another aspect combinable with any of the previous aspects further includes means for maintaining the sleeve at a particular position on the door lock.

In another aspect combinable with any of the previous aspects, the means for maintaining the sleeve at the particular position on the door lock includes means for preventing the sleeve from sliding from a lock stem of the door lock over a key cylinder of the door lock.

In another example implementation, a passenger vehicle includes a door configured to access a cabin of the passenger vehicle; and a door handle assembly mounted to the door and in accordance with any of the example implementations of the door handle assembly previously described (including one or more of the described aspects).

In another example implementation, a kit-of-parts for a door handle assembly of a passenger vehicle includes at least one container; and a door handle assembly that fits within the at least one container. The door handle assembly includes a door lock configured to adjust a door of a passenger vehicle between a locked position to impede access to a cabin through the door and an unlocked position to allow access to the cabin through the door, the door lock including a lock assembly and a lock stem, a panel assembly configured to mount to the door, the panel assembly including a front panel portion and a back panel coupled to the front panel portion, the back panel including an aperture sized and configured to receive at least the lock assembly of the door lock into a slotted portion of the back panel, and a sleeve sized to fit over at the lock stem and configured to rotate about the lock stem in response to an external force or an external torque applied to the sleeve.

In another aspect combinable with this example implementation, the sleeve is configured to rotate about the lock stem in response to the external force or the external torque applied to the sleeve without transmitting the external force or the external torque, through the lock stem, to the back panel assembly that is sufficient to break the back panel assembly.

Another aspect combinable with any of the previous aspects further includes a door handle including a first portion configured to pivotally couple to the panel assembly at a first end of the panel assembly, and a second portion including an opening configured to receive at least the lock stem of the door lock.

Another aspect combinable with any of the previous aspects further includes a snap ring configured to fit over a key cylinder of the door lock and maintain the sleeve at a particular position on the lock stem.

In another aspect combinable with any of the previous aspects, the snap ring includes a split snap ring.

In another aspect combinable with any of the previous aspects, the snap ring is biased to engage the key cylinder.

Another aspect combinable with any of the previous aspects further includes a snap ring pliers tool.

Another aspect combinable with any of the previous aspects further includes a portion of at least one of a welding material, a soldering material, a brazing material, or an adhesive material.

In another aspect combinable with any of the previous aspects, the sleeve includes a cylinder.

In another aspect combinable with any of the previous aspects, the sleeve includes a split cylinder.

In another aspect combinable with any of the previous aspects, the sleeve has a polygonal cross-section.

In another aspect combinable with any of the previous aspects, the sleeve is at least partially made from a metallic material.

In another aspect combinable with any of the previous aspects, the metallic material includes steel or aluminum.

In another aspect combinable with any of the previous aspects, the door lock includes a keyed door lock.

In another example implementation, a method includes moving a sleeve over a portion of a door lock, where the door lock is configured to adjust a door of a passenger vehicle between a locked position and an unlocked position; maintaining the sleeve on the portion of the door lock; and inserting the door lock through an aperture of a panel assembly configured to mount to the door to engage the panel assembly.

Another aspect combinable with any of the previous aspects further includes coupling a first portion of a door handle to the panel assembly; and engaging the door lock into an opening of the door handle at a second portion of the door handle opposite the first portion to receive a key cylinder of the door lock through the opening.

In another aspect combinable with any of the previous aspects, maintaining the sleeve on the portion of the door lock includes installing a snap ring over a key cylinder of the door lock adjacent to or abutting a shoulder of a lock stem of the door dock; and maintaining the sleeve on the lock stem with the snap ring.

In another aspect combinable with any of the previous aspects, the snap ring is biased to engage the key cylinder.

In another aspect combinable with any of the previous aspects, maintaining the sleeve on the portion of the door lock includes applying a material layer to the door lock; and maintaining the sleeve on a lock stem of the door lock with the material layer.

In another aspect combinable with any of the previous aspects, applying a material layer to the door lock includes applying the material layer to a key cylinder of the door lock adjacent to or abutting a shoulder of the lock stem.

In another aspect combinable with any of the previous aspects, the material layer includes at least one of a weld layer, a solder layer, a brazed layer, or an adhesive layer.

In another aspect combinable with any of the previous aspects, applying a material layer to a portion of the door lock includes applying the material layer to the lock stem.

In another aspect combinable with any of the previous aspects, the material layer includes at least one of a weld layer, a solder layer, a brazed layer, or an adhesive layer.

Another aspect combinable with any of the previous aspects further includes installing the door handle and the panel assembly into the door of the passenger vehicle.

In another aspect combinable with any of the previous aspects, moving the sleeve over the portion of the door lock includes moving the sleeve over a lock stem of the door lock adjacent to or abutting a shoulder of a lock assembly of the door lock.

Implementations of vehicle cabin security devices, systems, and methods according to the present disclosure include one or more of the following features. For example, implementations according to the present disclosure prevent or help prevent unauthorized entry into a vehicle cabin through a locked, driver door. As another example, implementations according to the present disclosure provide a cost effective deterrent to unauthorized entry into a vehicle cabin. As another example, implementations according to the present disclosure are efficiently integrated into existing door handle assemblies of vehicle doors (e.g., driver doors) to provide for prevention of unauthorized entry into a vehicle cabin.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes example implementations of a vehicle cabin security apparatus that can, for instance, be used to prevent unauthorized entry into a cabin of a passenger vehicle that is gained by breaking or disabling a locked, door handle assembly of the vehicle. In some aspects, the vehicle cabin security apparatus can prevent exposure (e.g., to an external force or torque) of a door lock or portion of a door lock of a vehicle door (such as a driver door) when a door handle is manipulated. The prevention of the exposure can prevent an external force or torque from being applied to the door lock (or portion thereof) to break or disable the door handle assembly. For example, the vehicle cabin security apparatus can cover or otherwise surround the portion of the door lock while also preventing transmission of a force or torque applied to the apparatus to the door lock (or portion thereof) and subsequently to break a portion of a door handle assembly, thereby unlocking the vehicle door in an unauthorized manner.

Figure 1A:
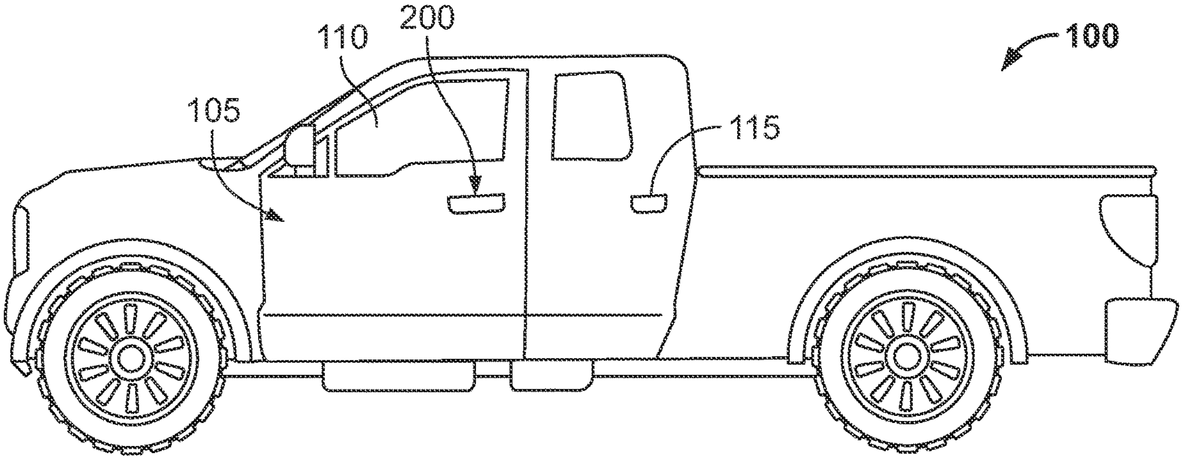
FIGS. 1A-1B are schematic diagrams of example passenger vehicles that include a door handle assembly with a vehicle cabin security apparatus according to the present disclosure.
Figure 1B:
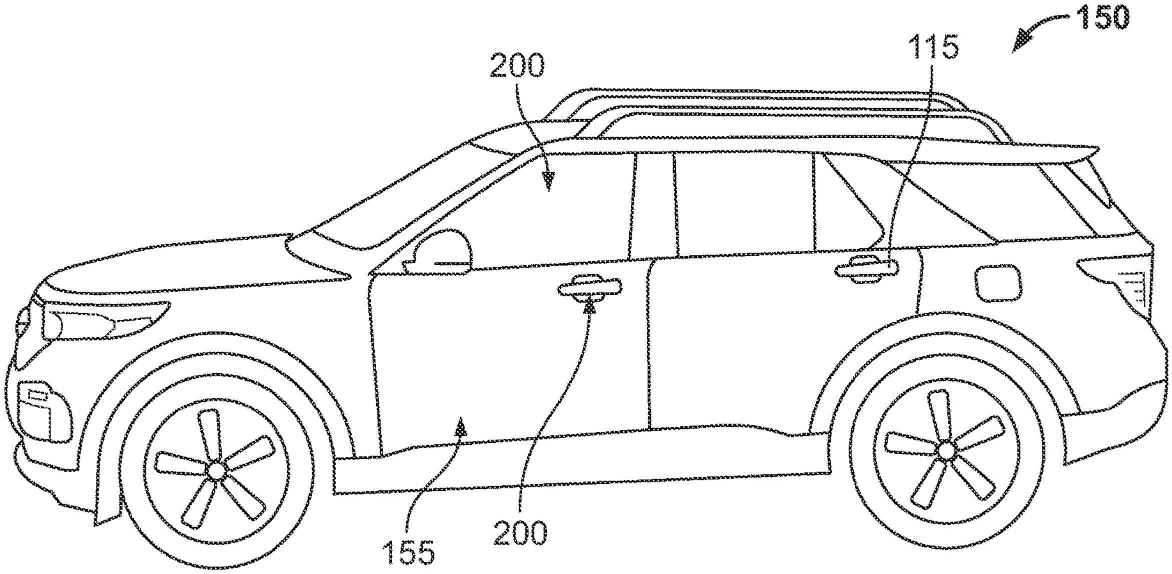

FIGS. 1A-1B are schematic diagrams of example passenger vehicles that include a door handle assembly with a vehicle cabin security apparatus according to the present disclosure. For example, FIG. 1A shows an example passenger vehicle 100 that, in this case, is a passenger truck 100 that includes two or more doors that allow or impede access into a vehicle cabin 110. In this example, there is a driver door 105, as well as other doors, such as passenger front and rear doors. As shown, the driver door 105 of the passenger truck 100 includes a door handle assembly 200 (described in more detail herein), which in some aspects comprises a keyed door handle assembly 200 (that can be locked or unlocked by a key, as well as by other techniques, such as by an alarm system or coded door entry keypad). Unauthorized entry into the vehicle cabin 110 is gained when the door handle assembly 200 (and thus the driver door 105) is unlocked, while unauthorized entry into the vehicle cabin 110 are prevented or impeded (at least through the driver door 105) when the door handle assembly 200 (and thus the driver door 105) is unlocked. In some aspects, the passenger truck 100 is a Ford® passenger truck, such as a model F-150®, F-250®, F-350® or otherwise. However, the present disclosure contemplates that the passenger truck 100 can be other makes or models as well.

FIG. 1B shows an example passenger vehicle 150 that, in this case, is a passenger SUV 150 that includes two or more doors that allow or impede access into a vehicle cabin 160. In this example, there is a driver door 155, as well as other doors (not labeled), such as passenger front and rear doors. As shown, the driver door 155 of the passenger SUV 150 includes the door handle assembly 200 (described in more detail herein), which in some aspects comprises the keyed door handle assembly 200 (that can be locked or unlocked by a key, as well as by other techniques, such as by an alarm system or coded door entry keypad). Unauthorized entry into the vehicle cabin 160 can be gained when the door handle assembly 200 (and thus the driver door 155) is unlocked, while unauthorized entry into the vehicle cabin 160 can be prevented or impeded (at least through the driver door 155) when the door handle assembly 200 (and thus the driver door 155) is unlocked. In some aspects, the passenger SUV 100 is a Ford® SUV, such as a model Explorer®, Expedition®, or otherwise. However, the present disclosure contemplates that the passenger SUV 150 can be other makes or models as well. Of course, the present disclosure contemplates that other vehicles besides trucks and SUVs, such as cars, sedans, coupes, or otherwise (of any manufacturer) can include a door handle assembly with a vehicle cabin security apparatus.

Door handle assembly 200 can comprise a vehicle cabin security apparatus, which prevents or helps prevent unauthorized entry into a passenger vehicle cabin by breaking a portion of the door handle assembly 200 through an external force or torque applied to a door lock of the door handle assembly 200 (as described previously). FIGS. 2A-2F are schematic illustrations of the door handle assembly 200 (or portion thereof) independent of a cabin security apparatus for a driver door of a vehicle, while FIGS. 3A and 3B are schematic illustrations of the door handle assembly 200 (or portion thereof) with an example implementation of a cabin security apparatus for a driver door of a vehicle according to the present disclosure.

Figure 2A:
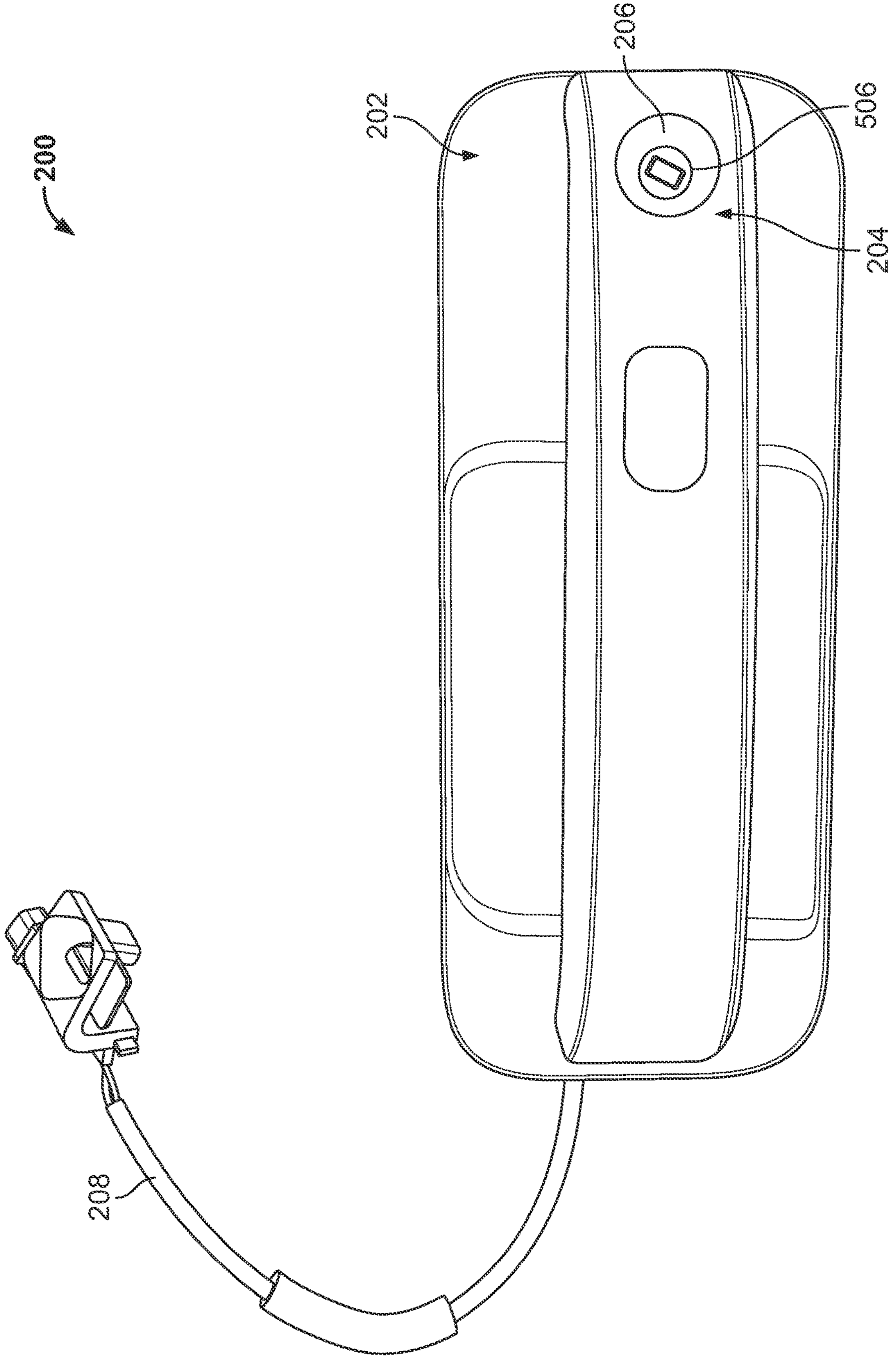
FIGS. 2A-2F are schematic illustrations of a door handle assembly (or portion thereof) independent of a cabin security apparatus for a driver door of a vehicle according to the present disclosure.

Turning first to FIGS. 2A-2D, the example implementation of the door handle assembly 200 is shown in a top view, a side view, bottom view, and partial bottom view, respectively. This example implementation of the door handle assembly 200 includes a panel assembly 202 and a door handle 204 (or handle 204) that couples to the panel assembly 202 (which in turn, can be installed in a passenger vehicle door, such as the driver doors 105 or 155). As shown in FIG. 2A, a key cylinder 506 of a door lock (500, described in more detail herein) is exposed through a key opening 206 of the handle 204 such that an operator key can be inserted therein to lock or unlock the door handle assembly 200 (and thus the passenger vehicle door).

Figure 2B:
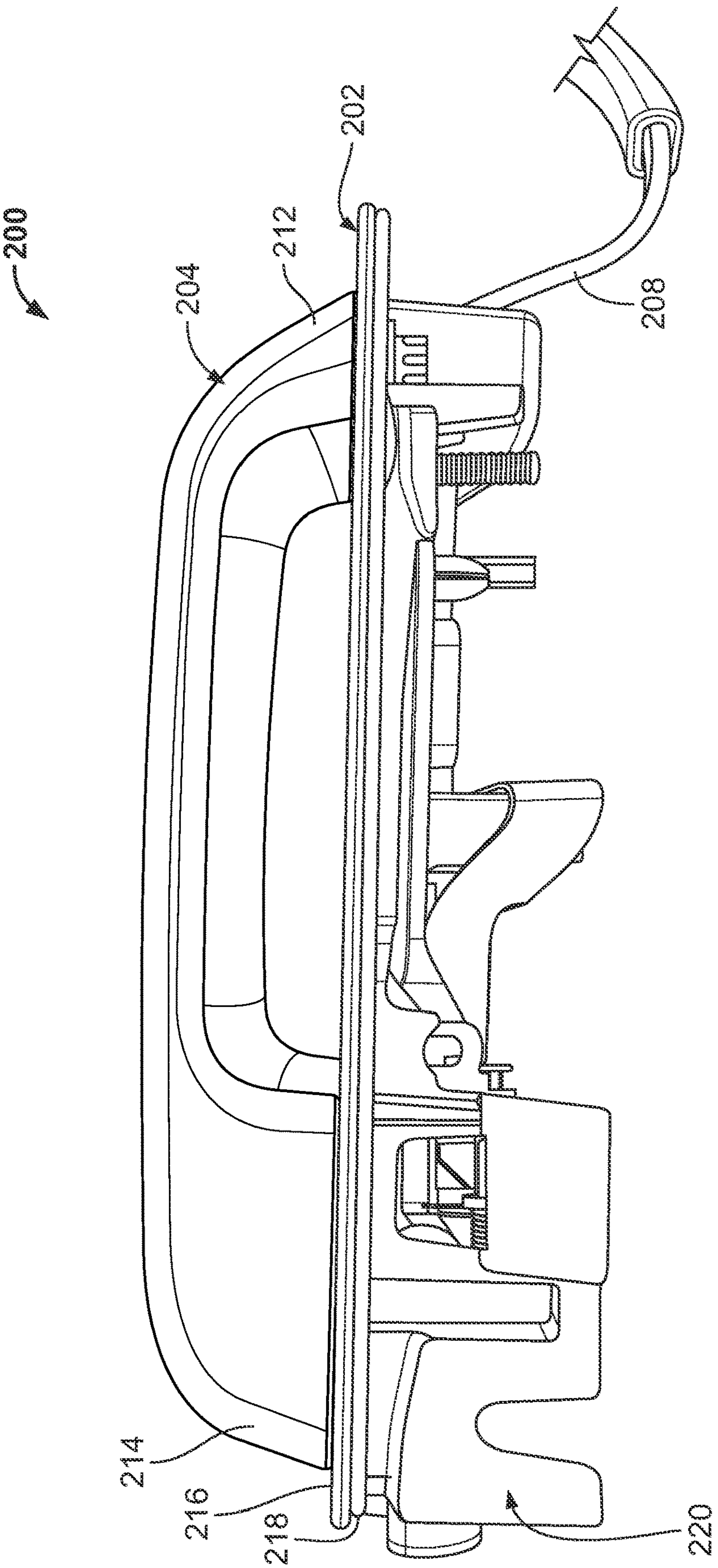
Figure 2C:
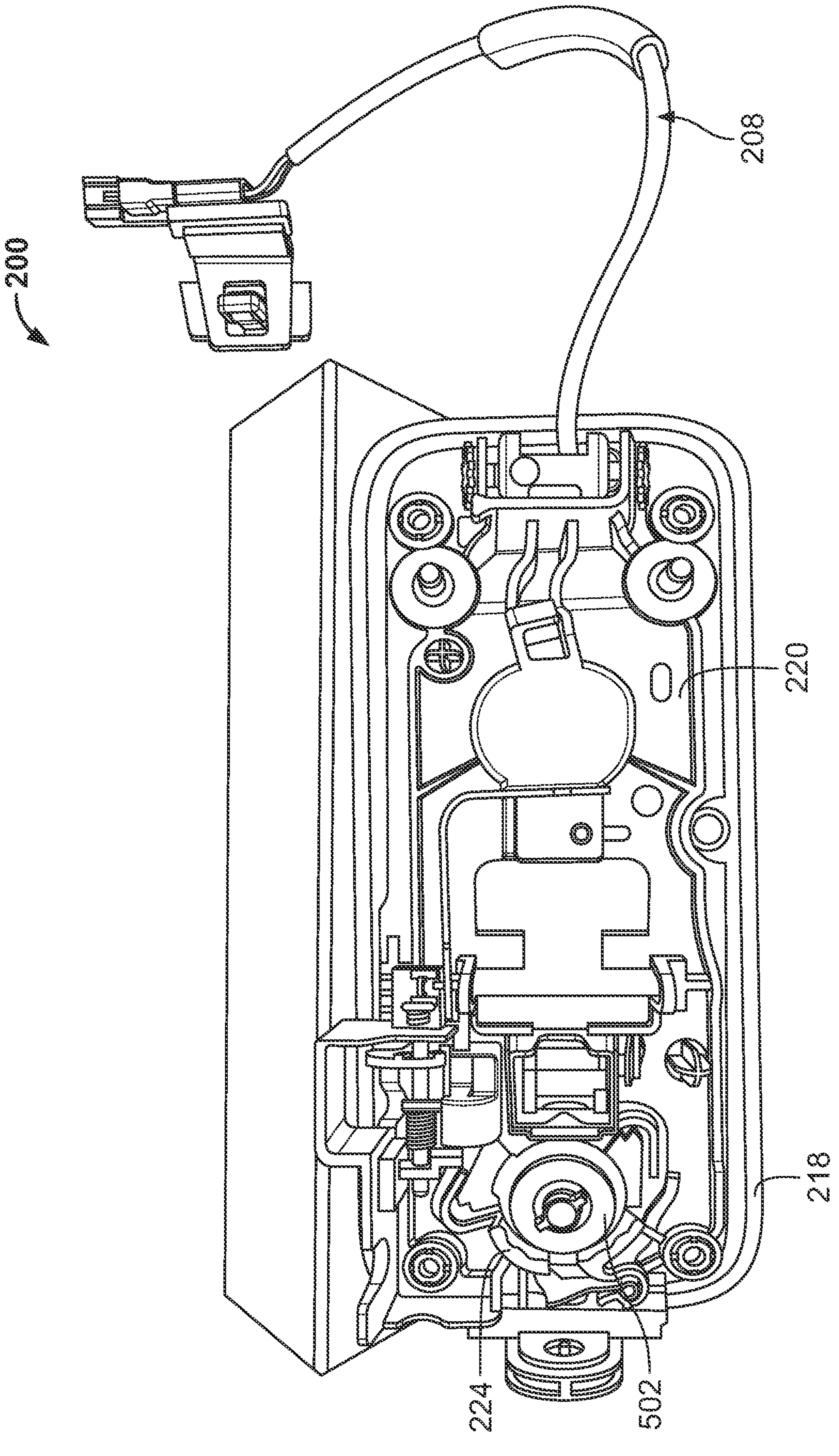
Figure 3A:
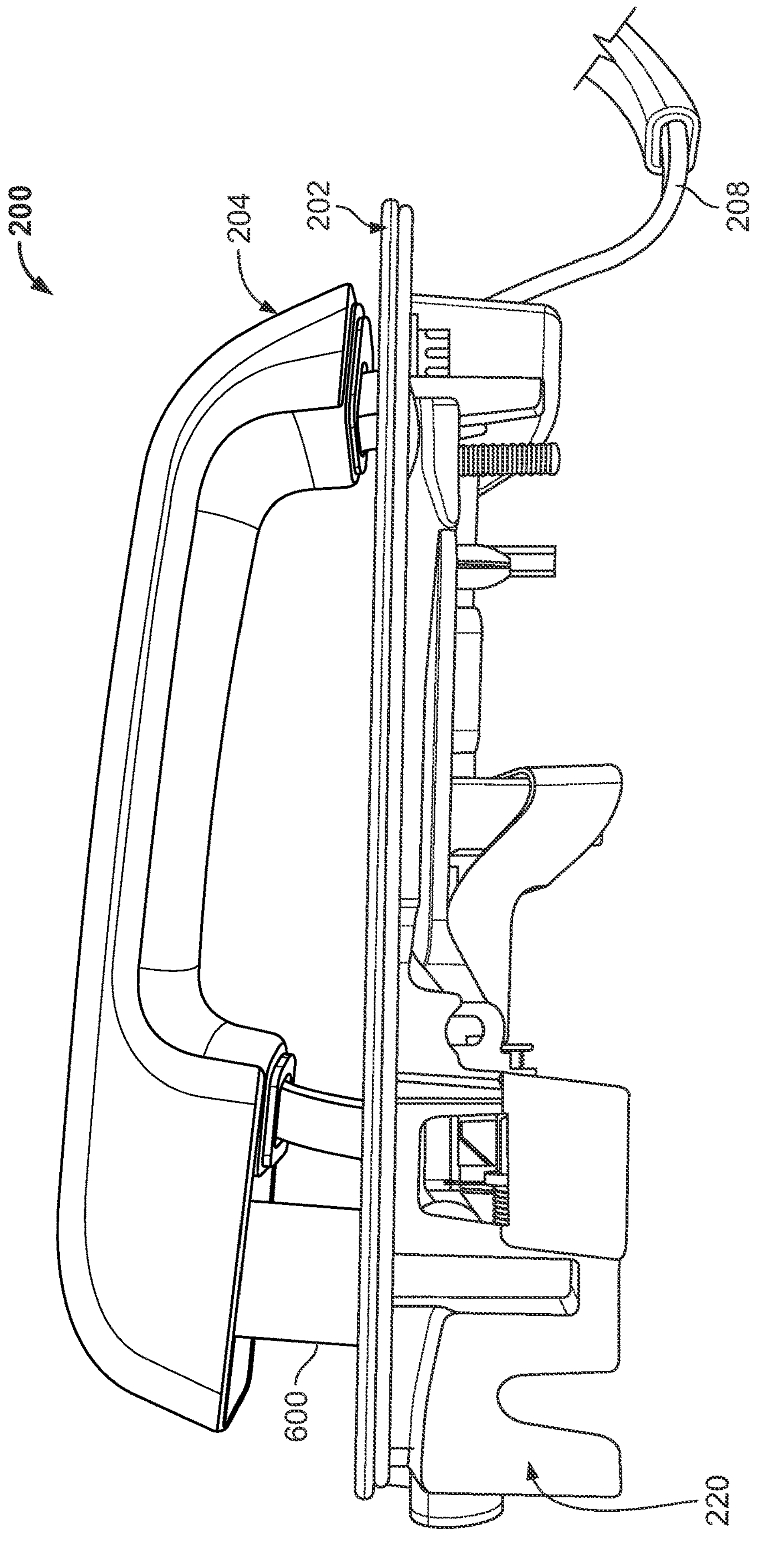
FIGS. 3A and 3B are schematic illustrations of a door handle assembly (or portion thereof) with an example implementation of a cabin security apparatus for a driver door of a vehicle according to the present disclosure.
Figure 3B:
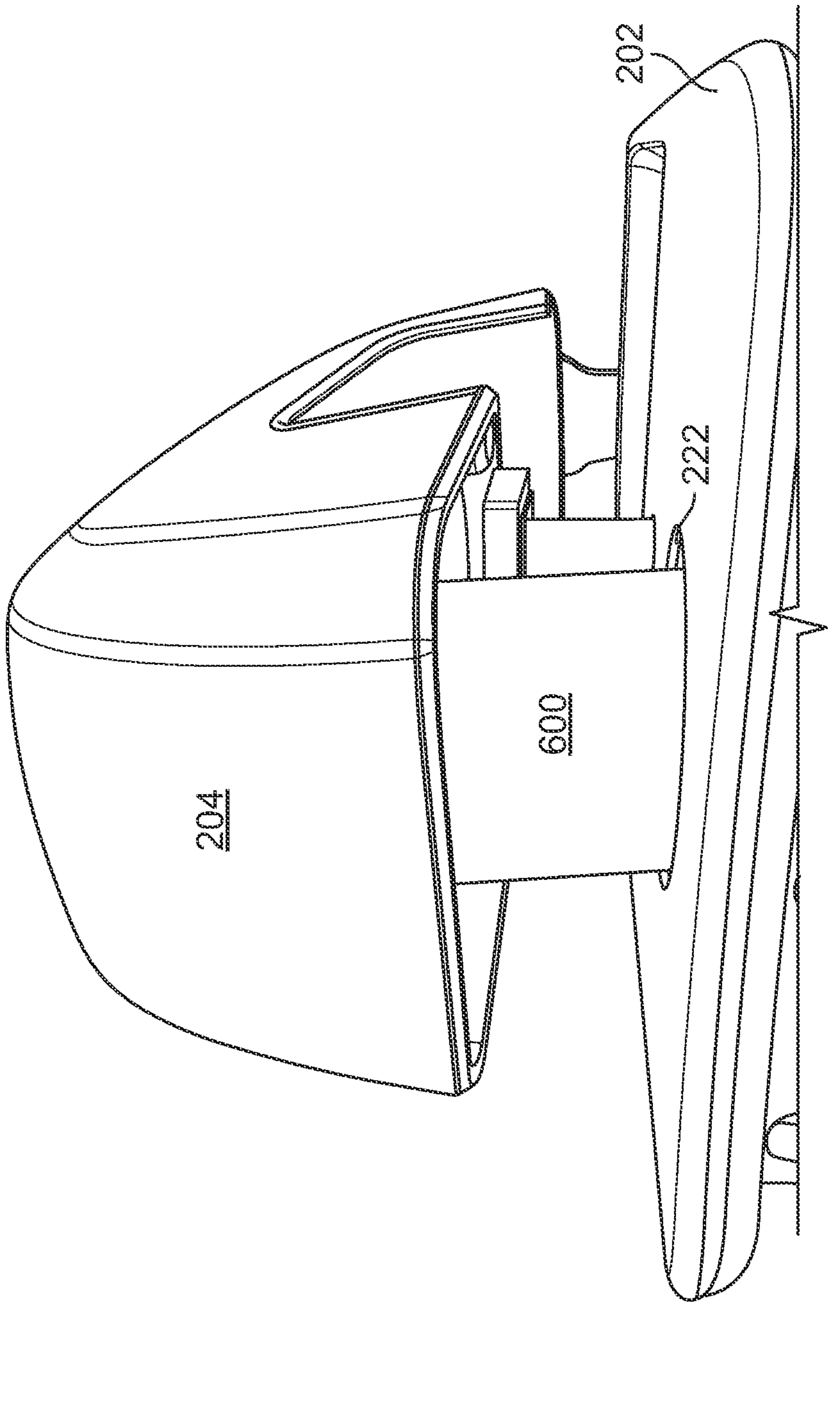

As further shown in FIGS. 2A-2C, a communication cable 208 extends from the door handle assembly 200 and connects to, for example, a vehicle alarm system or coded door entry system (or both) of a vehicle. In some aspects, the communication cable 208 can facilitate lock or unlock commands from one or both of a vehicle alarm system or coded door entry system to lock or unlock the door handle assembly 200 (and thus the passenger vehicle door).

As shown in FIGS. 2B and 2C, the example panel assembly 202 includes a front panel 216 and a back panel 220. The front panel 216, when the door handle assembly 200 is installed in a passenger vehicle door, can be flush with and integrated into the door panel of the passenger (including driver) vehicle door (such as doors 105 and 155). The back panel 220, when the door handle assembly 200 is installed in a passenger vehicle door, can be integrated within an internal chassis or structure of the passenger vehicle door. As further shown, a gasket 218 is positioned to prevent or impede an intrusion of moisture (or other material) on the front panel 216 into the chassis or interior structure of the passenger vehicle door.

Figure 2D:
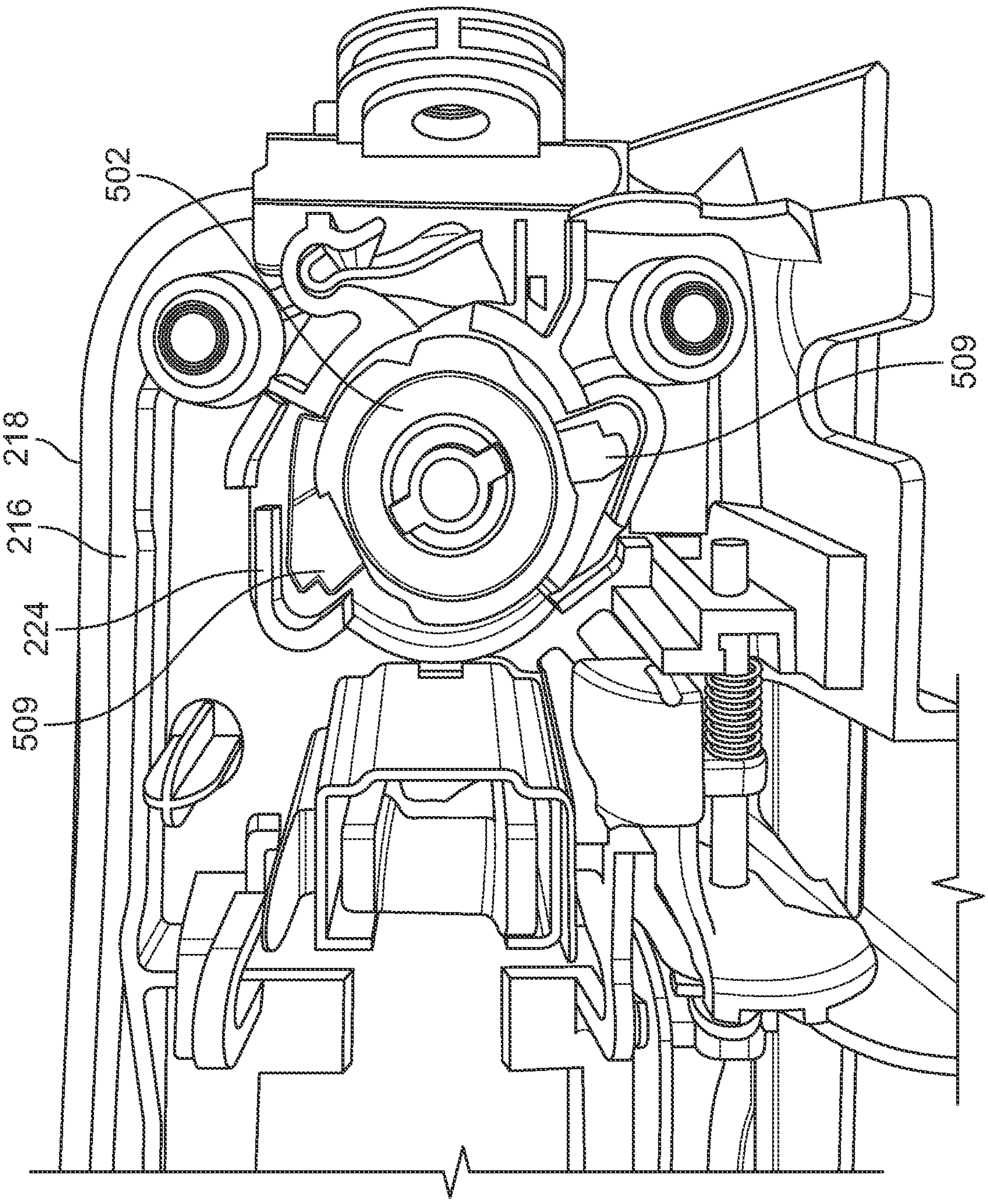
Figure 2E:
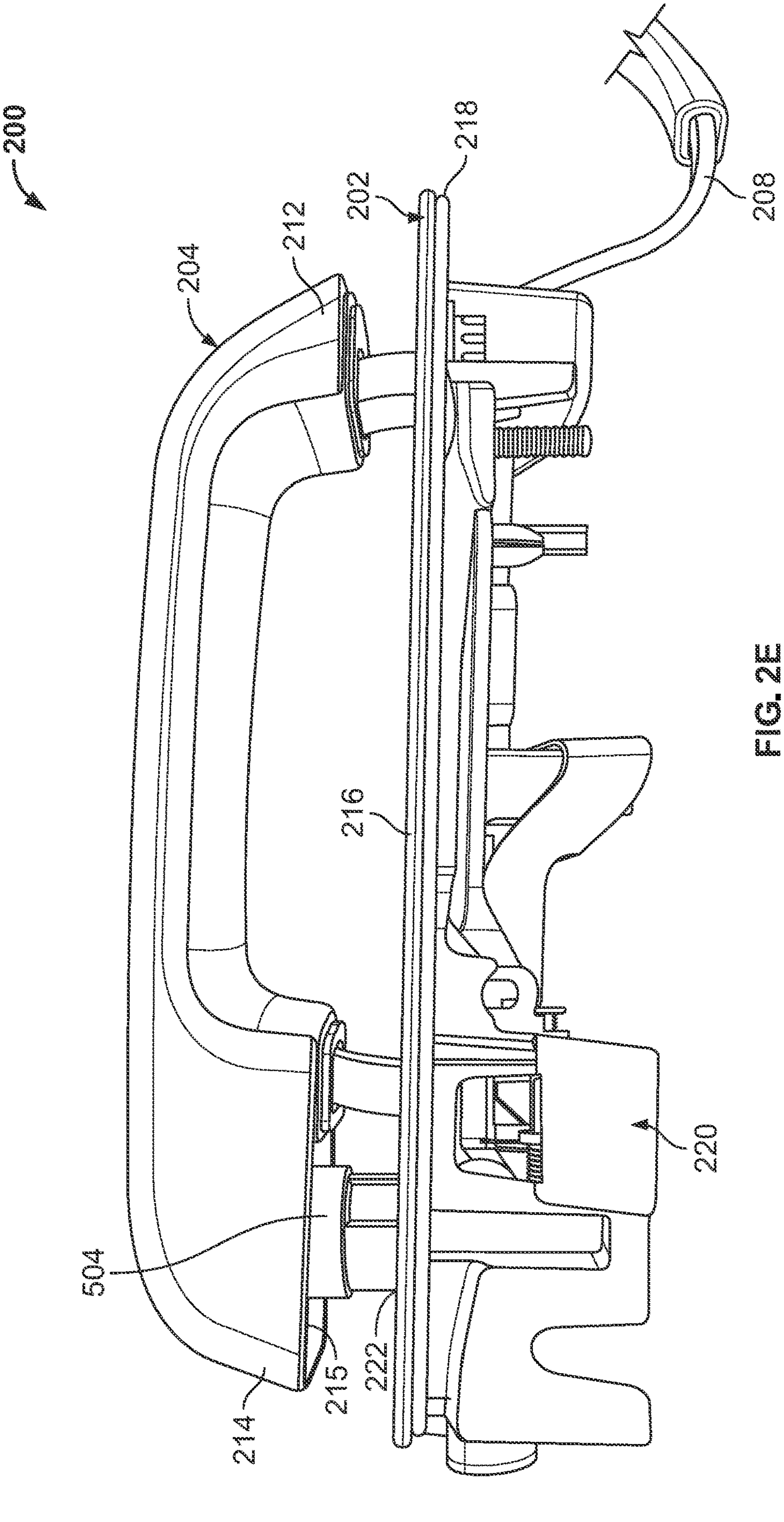
Figure 4:
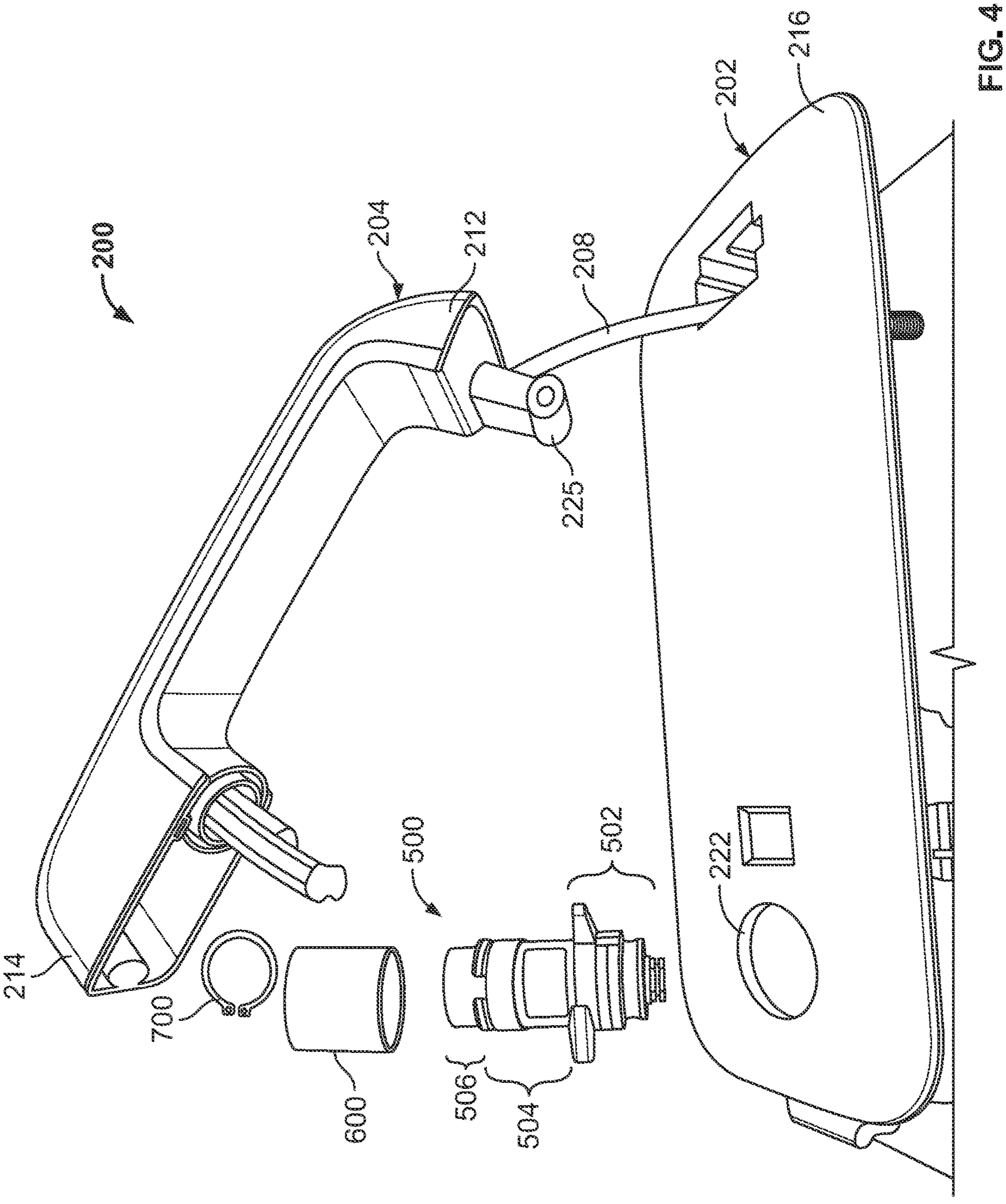
FIG. 4 is a schematic illustration of an exploded view of a door handle assembly (or portion thereof) with an example implementation of a cabin security apparatus for a driver door of a vehicle according to the present disclosure.

The handle 204, as shown, includes a pivot end 212 that pivotally couples to the panel assembly 202 through a pivot member 225 (shown in FIGS. 2E and 4). The handle 204 further includes a lock end 214 into which a door lock (such as the door lock 500 described herein) can be at least partially inserted, such that the key cylinder 506 of the door lock is accessible through key opening 206 (as shown in FIG. 2A). FIG. 2B shows the handle 204 in an unactuated position (i.e., when not actuated to open a passenger vehicle door) flush against the front panel 216.

The back panel 220 is coupled to the front panel 216 and, as with the handle 204, also receives a portion of a door lock (such as door lock 500 described herein). In some aspects, the back panel 220 can be formed of molded plastic, aluminum, other metal or non-metal, or other material. Turning now to FIGS. 2C and 2D, the back panel 220 is shown, as well as a lock assembly 502 of door lock 500 (shown in FIGS. 5A-5D). The lock assembly 502 can be inserted into an opening 222 of the back panel 220 and seated such that wings 509 of the lock assembly 502 are positioned within slots 224 of the back panel 220.

In some aspects, the position of the wings 509 of the lock assembly 502 relative to the slots 224 determines whether the door handle assembly 200 (and thus passenger vehicle door 105 or 155) is in a locked position or an unlocked position. For example, insertion of a key into the key cylinder 506 and rotation thereof can directly rotate the lock assembly 502 to align or misalign the wings 509 with the slots 224, thereby locking or unlocking the door handle assembly 200. However, forcible rotation of a lock stem (504) of the door lock (as described later)—if exposed from the handle 204—can also rotate the lock assembly 502 to break at least a portion of the back panel 220 (such as the slots 224), thereby unlocking the door handle assembly 200 and preventing re-locking of the door handle assembly 200 once broken.

Once broken, the door handle assembly 200 must be replaced at a great cost. In one option, a keyless door handle assembly 115 (specifically made for a non-driver door) rather than keyed door handle assembly 200 can be installed in a driver door 105 (or 155). While the keyless door handle assembly 115 does not include a door lock 500, and therefore would not be susceptible to further unauthorized entries but would eliminate authorized, keyed entry into the door 105 (or 155). The other option is to replace door handle assembly 200 (including a new door lock 500) but the cost to do so is even greater than the first option.

Figure 2F:
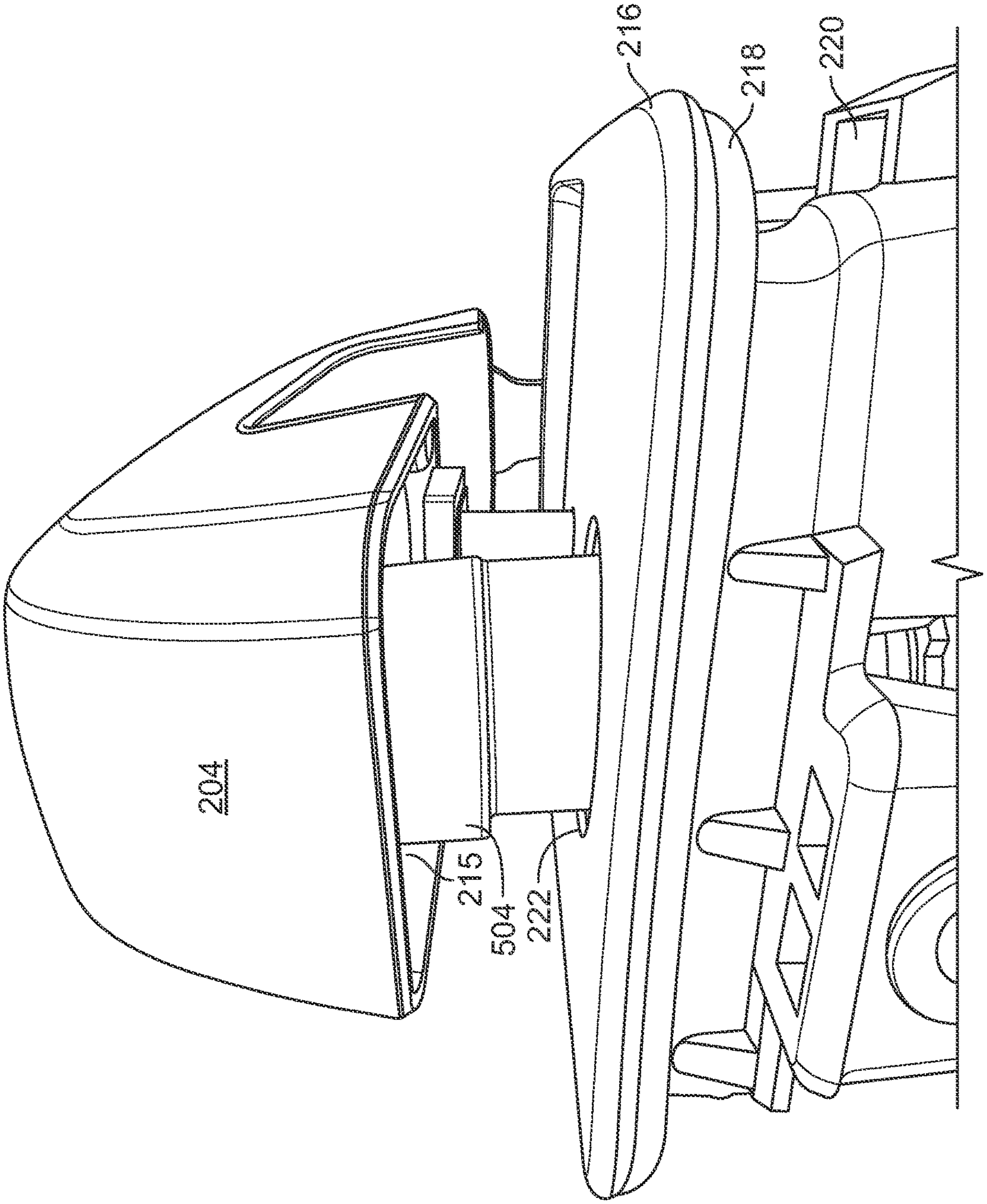

Turning to FIGS. 2E and 2F, these figures show the handle 204 moved away from the front panel 216 of the panel assembly 202, such as when the handle 204 would be pulled away from the front panel 216 during actuation of the door handle assembly 200 to open a passenger vehicle door (such as driver doors 105 and 155). In some aspects, even when the door handle assembly 200 is in a locked position (thus also placing the passenger vehicle door in a locked position), the handle 204 can be pulled away from the front panel 216 (i.e., pivoted about the pivot member 225), thereby exposing a lock stem 504 of the door lock 500.

The lock stem 504 is part of the door lock 500 between the key cylinder 506 and the lock assembly 502. When exposed, the lock stem 504 can be forcibly rotated (e.g., by a wrench, pliers, or other hand or machine tool) to also rotate the lock assembly 502 within the back panel 220. As noted, forcible rotation of the lock stem 504 of the door lock when exposed from the handle 204 can also rotate the lock assembly 502 to break at least a portion of the back panel 220 (such as the slots 224), thereby unlocking the door handle assembly 200 and preventing re-locking of the door handle assembly 200 once broken. This action can be taken even in the absence of a key being used in the key cylinder 506 to unlock the door handle assembly 200.

Turning now to FIGS. 3A and 3B, a sleeve 600 that comprises all or part of a vehicle cabin security apparatus is illustrated as installed over (e.g., to cover) the lock stem 504 of the door lock 500. Thus, as shown in FIG. 3A, the handle 204 is shown as in FIG. 2E, i.e., moved away from the front panel 216 of the panel assembly 202, such as when the handle 204 would be pulled away from the front panel 216 during actuation of the door handle assembly 200 to open a passenger vehicle door (such as driver doors 105 and 155), but the lock stem 504 is not exposed and is protected or covered by the sleeve 600. The sleeve 600 can ride on the lock stem 504 (such as rotate about the lock stem 504 with no or low friction contact there between and/or no or low torque transfer there between). In some aspects, an external force or torque applied to the sleeve 600 (such as by a wrench or pliers or other hand or machine tool) is not transferred to the lock stem 504. Or if transferred, any transferred portion of an external force or torque from the sleeve 600 to the lock stem 504 is less than a specified or required force necessary to break the back panel 220 by the lock assembly 502 of the door lock 500 (thereby allowing unauthorized access into a vehicle cabin). Thus, preventing access to the lock stem 504 by the sleeve 600 prevents unauthorized access into a vehicle cabin.

As shown in FIG. 3B, an opening 222 is formed in the front panel 216 and is sized to receive at least a portion of the sleeve 600 there through. For instance, the sleeve 600 may be sized to fit over most or all of the lock stem 504 of the door lock, so that when the handle 204 is actuated (e.g., pulled by a user such that the handle pivots about the pivot end 212 to open the passenger vehicle door), only or substantially only the sleeve 600 is exposed between the handle 204 and the front panel 216 on the lock end 214 of the handle 204.

FIG. 4 is a schematic illustration of an exploded view of the door handle assembly 200 (or portion thereof) with an example implementation of the cabin security apparatus for a driver door of a vehicle according to the present disclosure. In this example, the door handle assembly 200 is comprised of the handle 204, the panel assembly 202, the communication cable 208, and the door lock 500. The example implementation of the cabin security apparatus, in this example, is comprised of the sleeve 600 and a snap ring 700. As explained in more detail herein, the snap ring 700 can be installed over the key cylinder 506 of the door lock 500 and abut (or be adjacent to) a shoulder of the lock stem 504 in order to maintain a position of the sleeve 600 on the lock stem 504.

Figure 5A:
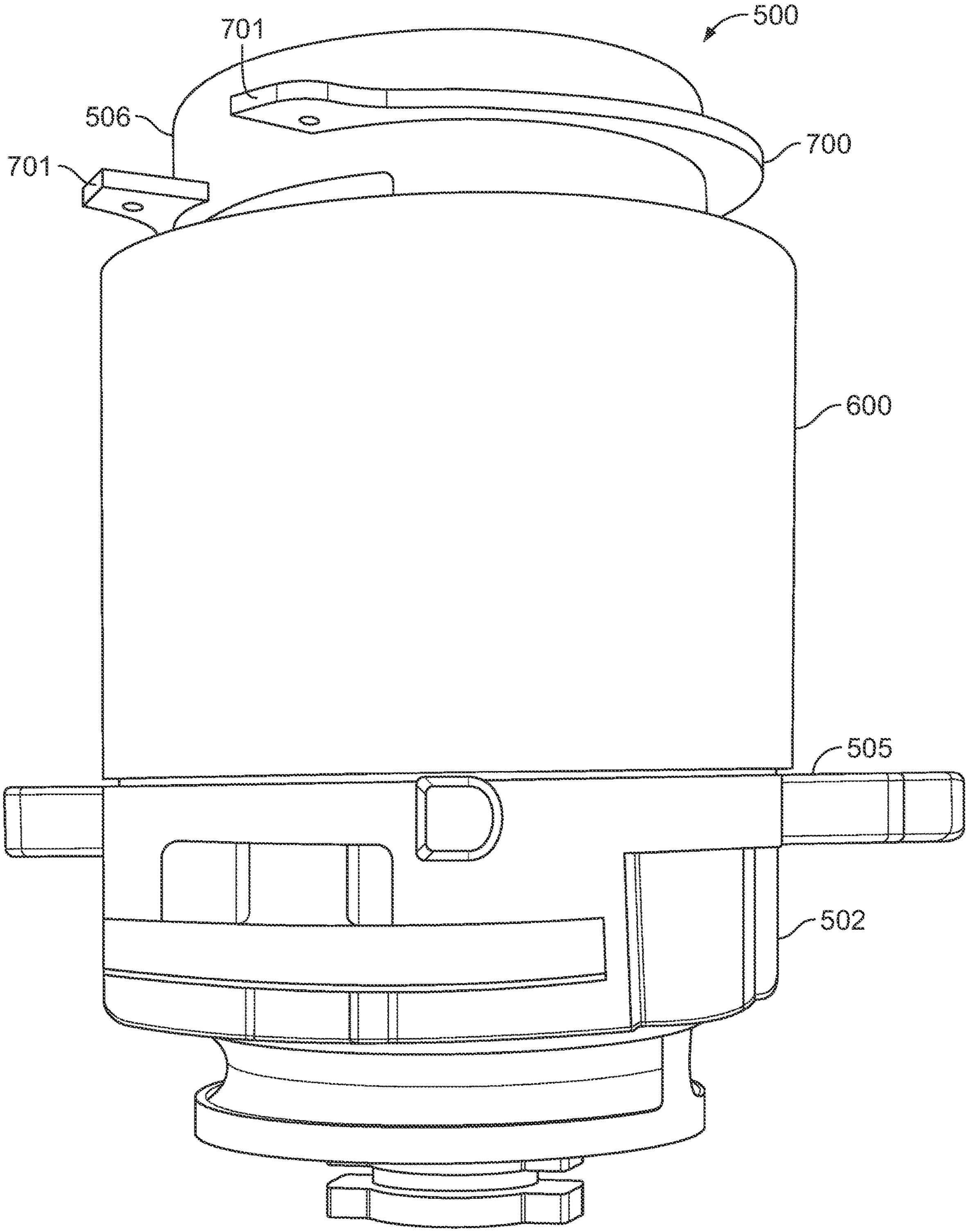
FIGS. 5A-5D are schematic illustrations of a door lock of a door handle assembly with an example implementation of a cabin security apparatus installed thereon according to the present disclosure.
Figure 5B:
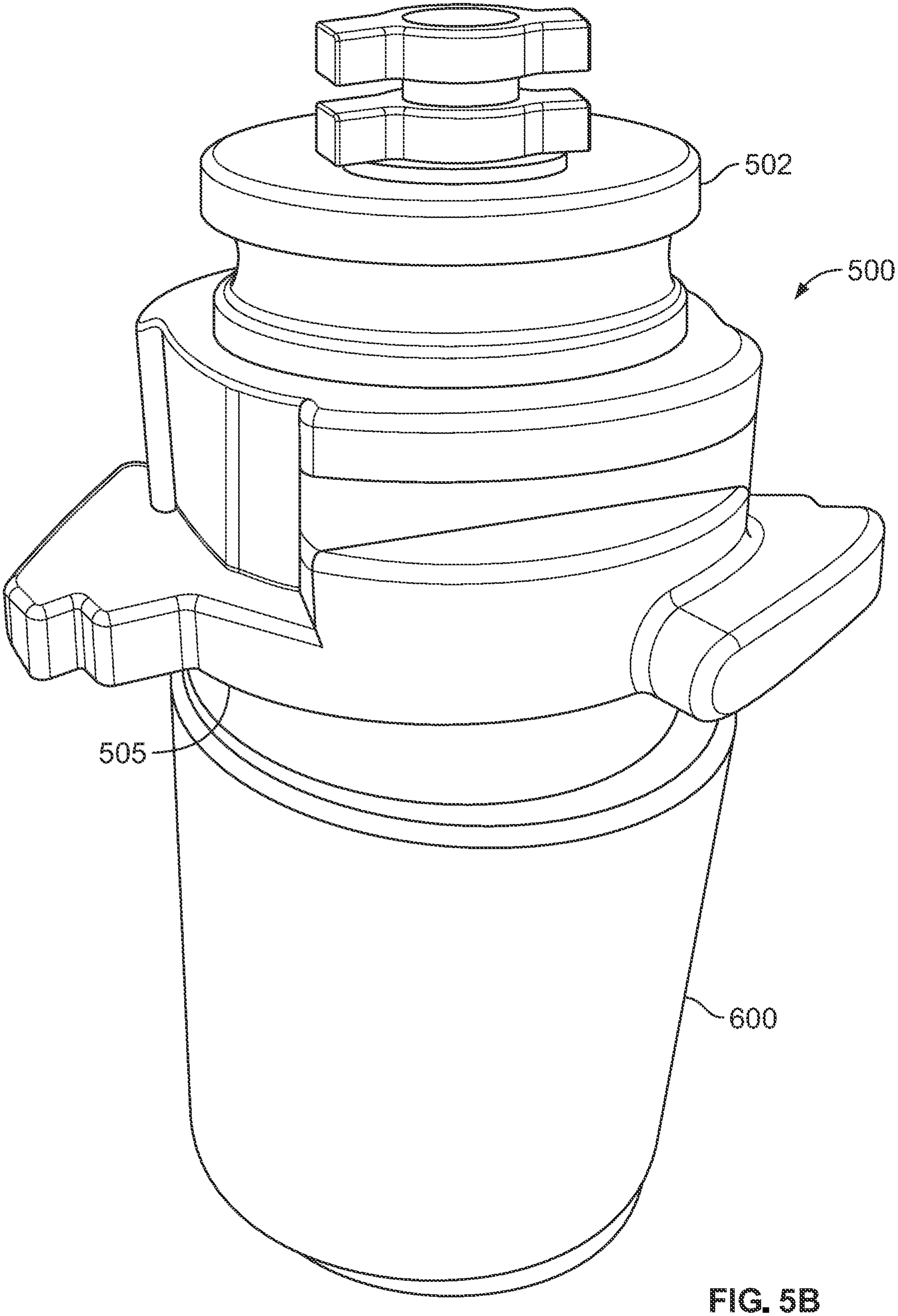
Figure 5C:
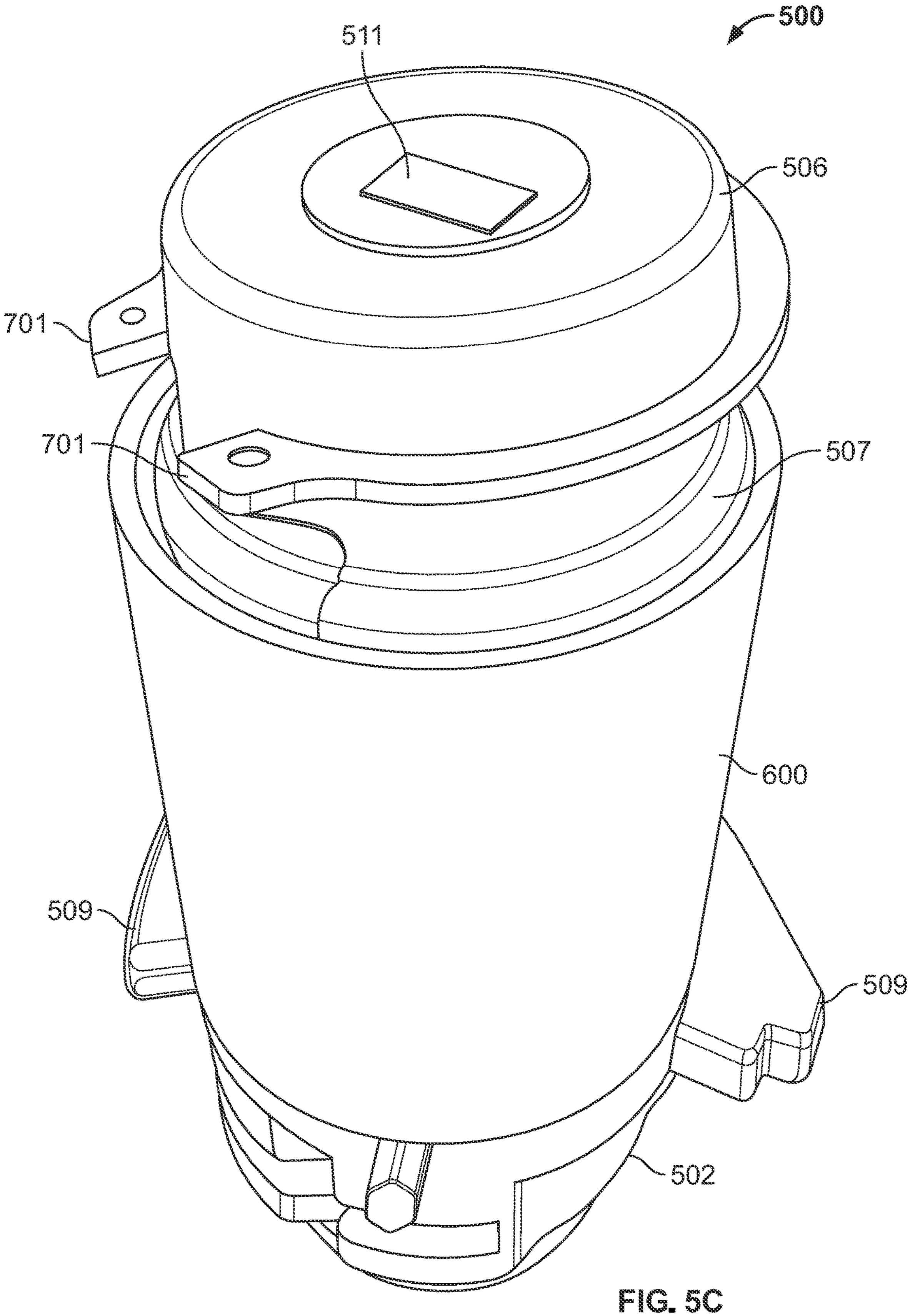

FIGS. 5A-5D are schematic illustrations of the door lock 500 of the door handle assembly 200 with an example implementation of a cabin security apparatus installed thereon according to the present disclosure. FIGS. 5A and 5C show side and isometric views of the door lock 500 in which the sleeve 600 is positioned over the lock stem 504 of the door lock 500 and abuts a shoulder 505 of the lock assembly 502 (such as when the sleeve 600 is installed onto the door lock 500 of the door handle assembly 200). As shown in this figure, the snap ring 700 is positioned on the key cylinder 506. In FIG. 5C, the snap ring 700 is shown placed on the key cylinder 506 in an intermediate position, i.e., not in the position in which it maintains the sleeve 600 positioned on the lock stem 504. As shown, the lock stem 504 includes a shoulder 507 adjacent the key cylinder 506 (in which an outer diameter of the door lock 500 reduces from a diameter of the lock stem 504 to a smaller diameter of the key cylinder 506). In a final position, the snap ring 700 can be placed to abut or be non-contactingly adjacent the shoulder 507 to maintain the sleeve 600 in a particular position on the lock stem 504 (and prevent the sleeve 600 from moving toward the key cylinder 506 from the lock stem 504).

In some aspects, the snap ring 700 is a flexible, split ring (as shown) that is biased radially toward its center. Thus, when positioned over the key cylinder 506, the snap ring 700 grips the cylinder 506 to remain substantially secure in a particular position (as placed by a user). The snap ring 700 can have two terminal ends 701, each with holes to receive a snap ring wrench (shown in FIG. 8) that can be used to manipulate the snap ring 700 and position it on the key cylinder 506.

Although the snap ring 700 is shown as a split ring in this example, a "snap ring" according to the present disclosure can refer to any member that can be positioned on the key cylinder 506, and remain adjacent or abutting the shoulder 507 of the lock stem 504, and maintain the sleeve 600 on the lock stem 504 (such as by preventing movement of the sleeve 600 onto the key cylinder 506).

In some aspects, the sleeve 600 is formed from a metallic material, such as steel (stainless or galvanized), titanium, iron, aluminum, or other metallic material. Alternatively, the sleeve 600 can be formed from a rigid, non-metallic material, such as rigid nonmetallic conduit, polyvinyl chloride (PVC), or other material that will not be crushed or compressed by a wrench or pliers. In some aspects, the sleeve 600 can be 3 cm in axial length (plus or minus between 2-5 mm), 2.5 cm in outer diameter (plus or minus 1-2 mm), and 2.2 cm in inner diameter (plus or minus 1-2 mm).

FIG. 5B shows another view of the door lock 500 with the sleeve 600 positioned over the lock stem 504. FIG. 5B also shows a shoulder 505 of the lock assembly 502. When the sleeve 600 is positioned over the lock stem 504 and held in place by the snap ring 700, the sleeve 600 can abut or be non-contactingly adjacent the shoulder 505 of the lock assembly 502.

Figure 5D:
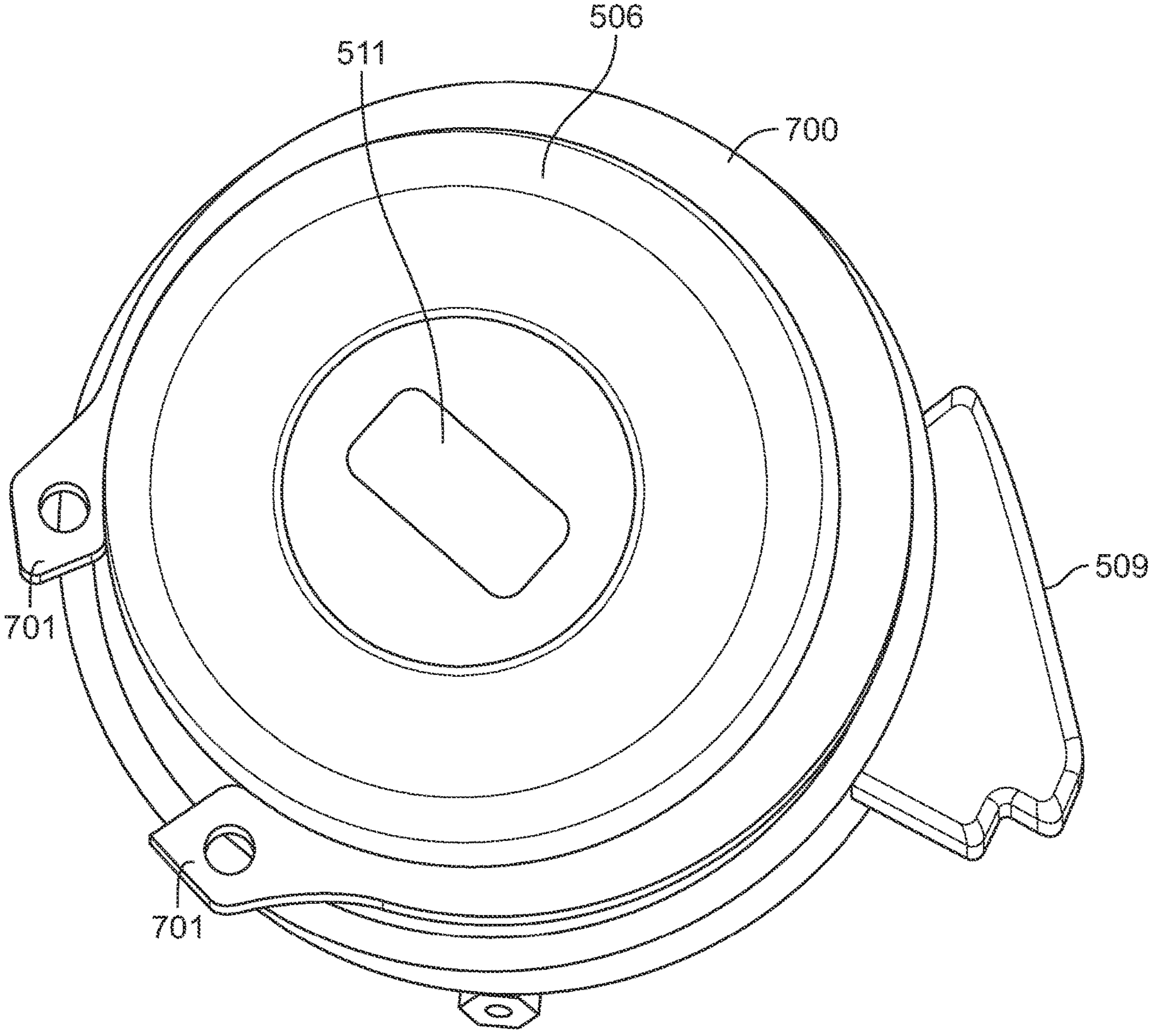

FIG. 5D shows a top view of the door lock 500 with the sleeve 600 in place on the lock stem 504 and the snap ring 700 positioned adjacent the shoulder 507 (not labeled here). As shown in this figure (and others), the key cylinder 506 includes a keyhole 511 into which a key can be inserted to manipulate the door lock 500 between a locked and unlocked position in the door handle assembly 200 (and thus manipulate the driver door 105 between a locked and unlocked position). By manipulating a key in the keyhole 511, the lock stem 504 and lock assembly 502 can turn (the latter within the back panel 220).

Figure 6A:
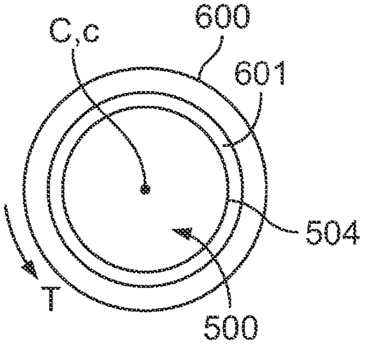
FIGS. 6A-6C are schematic illustrations of end views of example implementations of a vehicle door lock with an example implementation of a cabin security apparatus installed thereon according to the present disclosure.
Figure 6B:
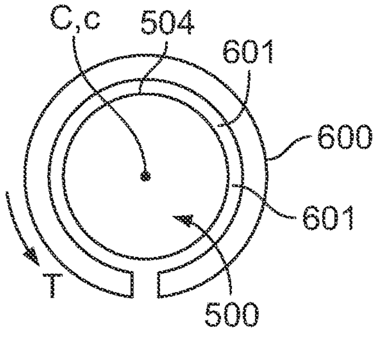
Figure 6C:
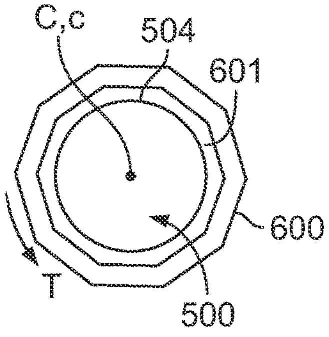

FIGS. 6A-6C are schematic illustrations of end views of example implementations of the vehicle door lock with an example implementation of a cabin security apparatus installed thereon according to the present disclosure. These figures show radial sectional views of different implementations of a sleeve 600 positioned on the lock stem 504. FIG. 6A shows an example of the sleeve 600, which includes a circular cross-section as shown. The sleeve 600 in FIG. 6A can be sized so that, when a radial centerline, c, of the sleeve 600 is aligned with a radial centerline, C, of the lock stem 504 (with the centerlines shown in FIGS. 7A, 7C, and 7E), an annulus 601 is created, thereby allowing the sleeve 600 to rotate freely or at a low or reduced friction with the lock stem 504 in response to an external force or torque, T. Due to the free rotation relative to the lock stem 504 (or the low or reduced friction between sleeve 600 and lock stem 504), the sleeve 600 can act as a torque isolator to the lock stem 504, thus ensuring that none of the torque, T, or an amount insufficient to break a part of the panel assembly 202 (such as the back panel 220) by the lock assembly 502, is transferred from the sleeve 600 to the lock stem 504 (and then to the lock assembly 502 and back panel 220).

FIG. 6B shows another example of the sleeve 600, which includes a split-circular cross-section as shown. The sleeve 600 in FIG. 6B can also be sized so that, when a radial centerline, c, of the sleeve 600 is aligned with a radial centerline, C, of the lock stem 504, an annulus 601 is created, thereby allowing the sleeve 600 to rotate freely or at a low or reduced friction with the lock stem 504 in response to an external force or torque, T. As with the sleeve 600 of FIG. 6A, due to the free rotation relative to the lock stem 504 (or the low or reduced friction between sleeve 600 and lock stem 504), the sleeve 600 in FIG. 6B can act as a torque isolator to the lock stem 504, thus ensuring that none of the torque, T, or an amount insufficient to break a part of the panel assembly 202 (such as the back panel 220) by the lock assembly 502, is transferred from the sleeve 600 to the lock stem 504 (and then to the lock assembly 502 and back panel 220).

FIG. 6C shows another example of the sleeve 600, which includes a polygonal cross-section as shown (in this example, a decagonal cross-section, but the present disclosure contemplates that other polygonal structures can be used for the sleeve 600 as well). The sleeve 600 in FIG. 6C can also be sized so that, when a radial centerline, c, of the sleeve 600 is aligned with a radial centerline, C, of the lock stem 504, an annulus 601 is created, thereby allowing the sleeve 600 to rotate freely or at a low or reduced friction with the lock stem 504 in response to an external force or torque, T. As with the sleeve 600 of FIGS. 6A and 6B, due to the free rotation relative to the lock stem 504 (or the low or reduced friction between sleeve 600 and lock stem 504), the sleeve 600 in FIG. 6C can act as a torque isolator to the lock stem 504, thus ensuring that none of the torque, T, or an amount insufficient to break a part of the panel assembly 202 (such as the back panel 220) by the lock assembly 502, is transferred from the sleeve 600 to the lock stem 504 (and then to the lock assembly 502 and back panel 220).

Figure 7A:
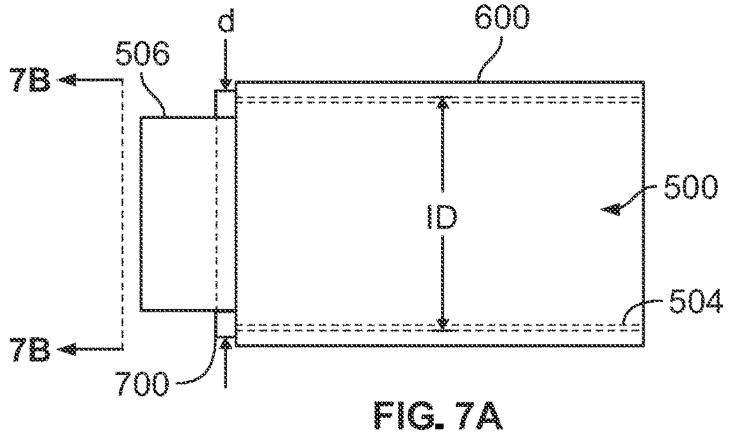
FIGS. 7A and 7B are schematic illustrations of side and end views, respectively, of an example implementation of a portion of a cabin security apparatus secured to a vehicle lock according to the present disclosure.
Figure 7B:
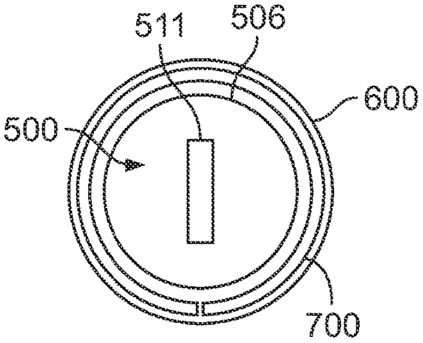

FIGS. 7A and 7B are schematic illustrations of side and end views, respectively, of an example implementation of a portion of a cabin security apparatus secured to a vehicle door lock according to the present disclosure. FIG. 7A shows a side view of the sleeve 600 positioned on the lock stem 504 of the door lock 500, while FIG. 7B shows a radial cross-section taken of FIG. 7A. In this example, the snap ring 700 is used to maintain the sleeve 600 on the lock stem 504 as shown. More specifically, as shown in FIG. 7A, the snap ring 700, when positioned on the key cylinder 506, has an outer dimeter, d, that is greater than an inner diameter, ID, of the sleeve 600 (and larger than the outer diameter of the lock stem 504).

Figure 7C:
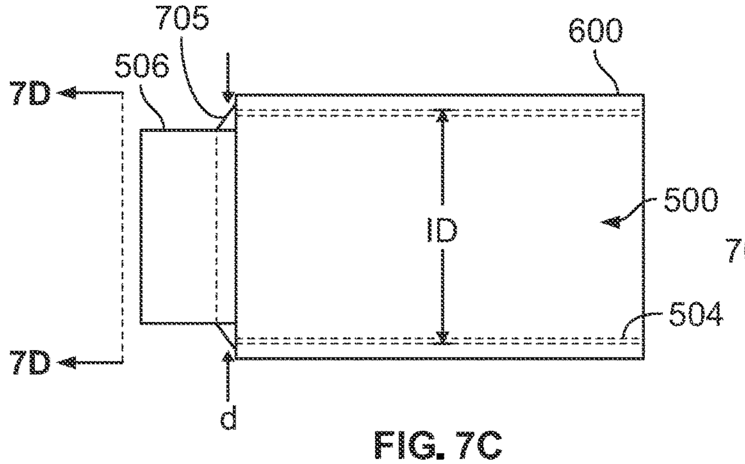
FIGS. 7C and 7D are schematic illustrations of side and end views, respectively, of another example implementation of a portion of a cabin security apparatus secured to a vehicle lock according to the present disclosure.
Figure 7D:
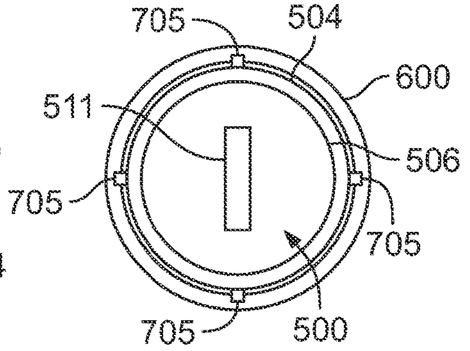

FIGS. 7C and 7D are schematic illustrations of side and end views, respectively, of another example implementation of a portion of a cabin security apparatus secured to a vehicle lock according to the present disclosure. FIG. 7C shows a side view of the sleeve 600 positioned on the lock stem 504 of the door lock 500, while FIG. 7D shows a radial cross-section taken of FIG. 7C. In this example, a material deposition layer 705 is used to maintain the sleeve 600 on the lock stem 504 as shown. More specifically, as shown in FIG. 7C, in an example, the material deposition layer 705 can be a ring formed on the key cylinder 506 adjacent the lock stem 504 with enough thickness so that a diameter, d, of the material deposition layer 710 is greater than the inner diameter, ID, of the sleeve 600. Although shown as a ring in FIG. 7C, the material deposition layer 705 can also just be formed in portions 705 of the material deposition as shown in FIG. 7D to maintain the sleeve 600 on the lock stem 504.

The material deposition layer 705 can be, for example, a weld layer ring (in FIG. 7C) or weld tacks (in FIG. 7D); a solder layer ring (in FIG. 7C) or solder tacks (in FIG. 7D); or a brazed layer ring (in FIG. 7C) or brazed tacks (in FIG. 7D). The type of material may depend on, for example, a material of which the door lock 500 is formed. In some aspects, the material deposition layer 705 is connected to (e.g., adhered thereto as an adhesive) or integrally formed with the key cylinder 506 but is not connected to or otherwise attached to the sleeve 600. Thus, the sleeve 600 can still move (e.g., rotate) about the lock stem 504 without impedance by the material deposition layer 705.

However, in some aspects, the material deposition layer 705 can be connected (e.g., adhered thereto as an adhesive) or integrated with both the key cylinder 506 and the sleeve 600, thereby connecting the sleeve 600 to the key cylinder 506. In such cases, a force or torque required to break a connection between the sleeve 600 and the material deposition layer 705 (and thus the connection between the sleeve 600 and the key cylinder 506) is less than a force sufficient to break part of the panel assembly 202 (e.g., the back panel 220) by forcible rotation of the lock assembly 502 (transmitted from the force or torque on the sleeve 600 through the key cylinder 506 and/or lock stem 504). In such cases, therefore, a force or torque applied to the sleeve 600 to break the door handle assembly 200 and gain unauthorized entry into a vehicle cabin will break the connection between the material deposition layer 705 and the sleeve 600, but not the door handle assembly 200.

Figure 7E:
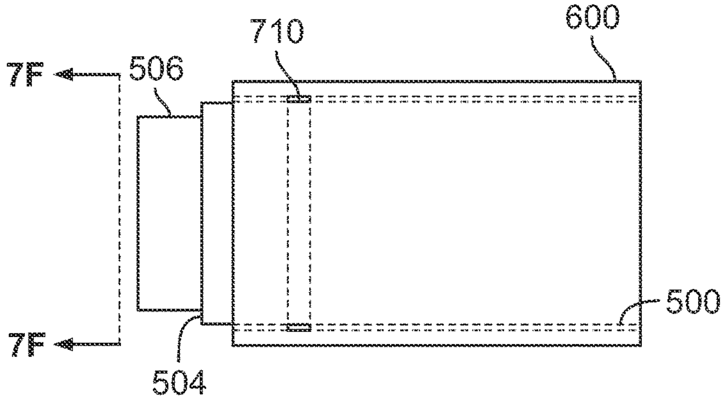
FIGS. 7E and 7F are schematic illustrations of side and end views, respectively, of another example implementation of a portion of a cabin security apparatus secured to a vehicle lock according to the present disclosure.
Figure 7F:
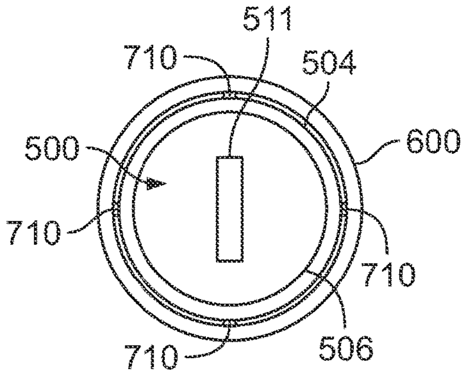

FIGS. 7E and 7F are schematic illustrations of side and end views, respectively, of another example implementation of a portion of a cabin security apparatus secured to a vehicle lock according to the present disclosure. FIG. 7E shows a side view of the sleeve 600 positioned on the lock stem 504 of the door lock 500, while FIG. 7F shows a radial cross-section taken of FIG. 7E. In this example, a material deposition layer 710 is used to maintain the sleeve 600 on the lock stem 504 as shown. More specifically, as shown in FIG. 7E, in an example, the material deposition layer 710 can be a ring formed on the lock stem 504 and between the lock stem 504 and the sleeve 600. Although shown as a ring in FIG. 7E, the material deposition layer 710 can also just be formed in portions 710 of the material deposition as shown in FIG. 7F to maintain the sleeve 600 on the lock stem 504.

The material deposition layer 710 can be, for example, an adhesive layer ring (in FIG. 7E) or adhesive tacks (in FIG. 7F). The adhesive can be an epoxy, glue, or any adhesive that can bond the sleeve 600 to the lock stem 504 (or other portion of the door lock 500), such as bond between metals. Thus, the material deposition layer 710 can connect the lock stem 504 and the sleeve 600. In such cases, a force or torque required to break the connection between the sleeve 600 and the material deposition layer 710 is less than a force sufficient to break part of the panel assembly 202 (e.g., the back panel 220) by forcible rotation of the lock assembly 502 (transmitted from the force or torque on the sleeve 600 through the key cylinder 506 and/or lock stem 504). In such cases, therefore, a force or torque applied to the sleeve 600 to break the door handle assembly 200 and gain unauthorized entry into a vehicle cabin will break the connection between the material deposition layer 710 and the sleeve 600, but not the door handle assembly 200.

Figure 8:
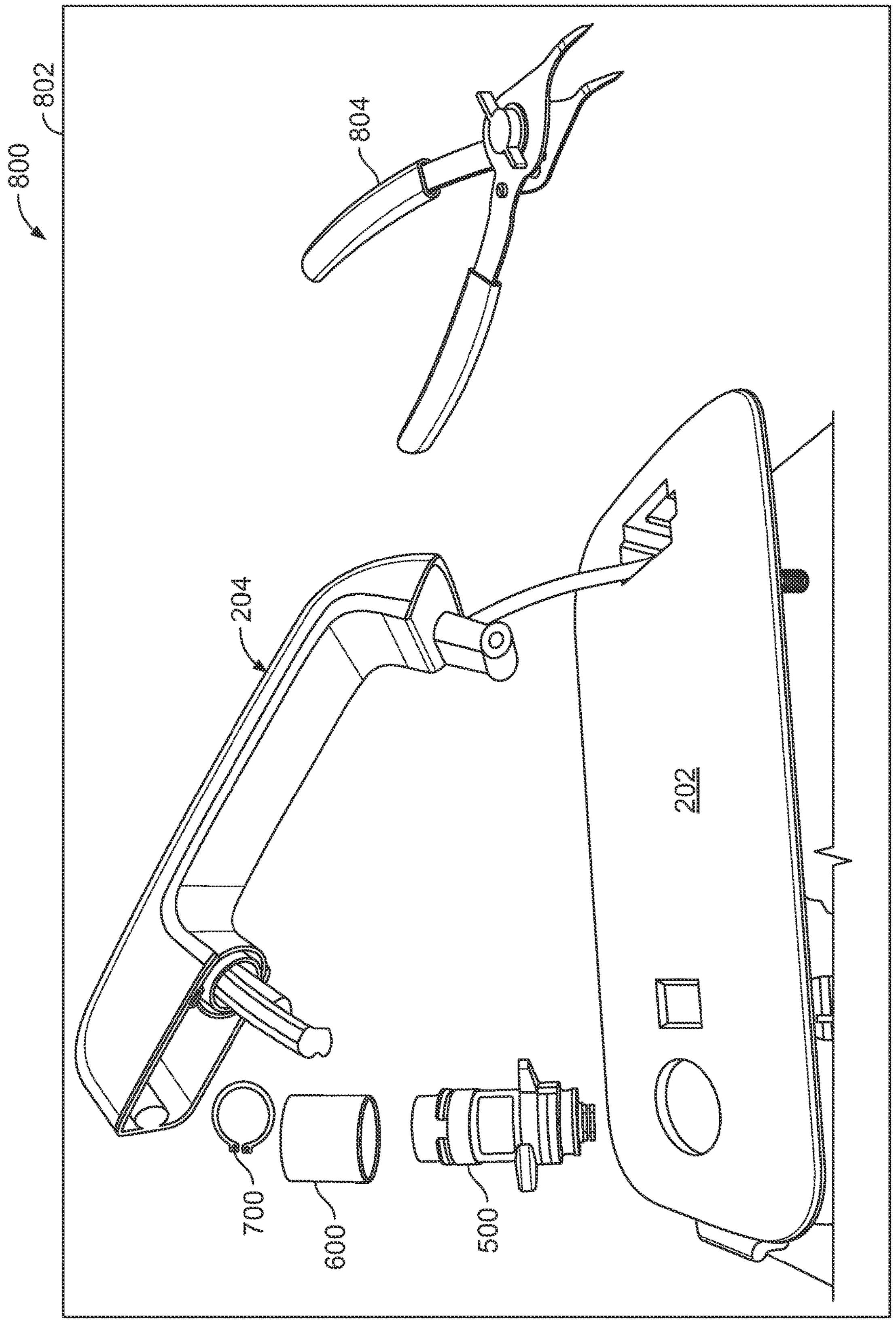
FIG. 8 is a schematic illustration of an example implementation of a kit-of-parts for a vehicle door handle assembly according to the present disclosure.

FIG. 8 is a schematic illustration of an example implementation of a kit-of-parts for a vehicle door handle assembly according to the present disclosure. For example, as shown in this figure, a kit-of-parts 800 for the door handle assembly 200 can include at least one container 802 to hold the components of the kit-of-parts 800 (e.g., for shipment or storage or otherwise). The container 802 can be, for instance, a box, envelope, bag, or other container sized to hold the components. In this example, the kit-of-parts 800 includes the sleeve 600 and the snap ring 700. Optionally, the kit-of-parts 800 can include a set of snap ring pliers 804 (e.g., to use to position the snap ring 700 on the door lock 500). Optionally, the kit-of-parts 800 can further include the door handle assembly 200, itself, such as the panel assembly 202, the handle 204, and the door lock 500. In some aspects, however, the door handle assembly 200 may be provided separately from the kit-of-parts 800.

Figure 9:
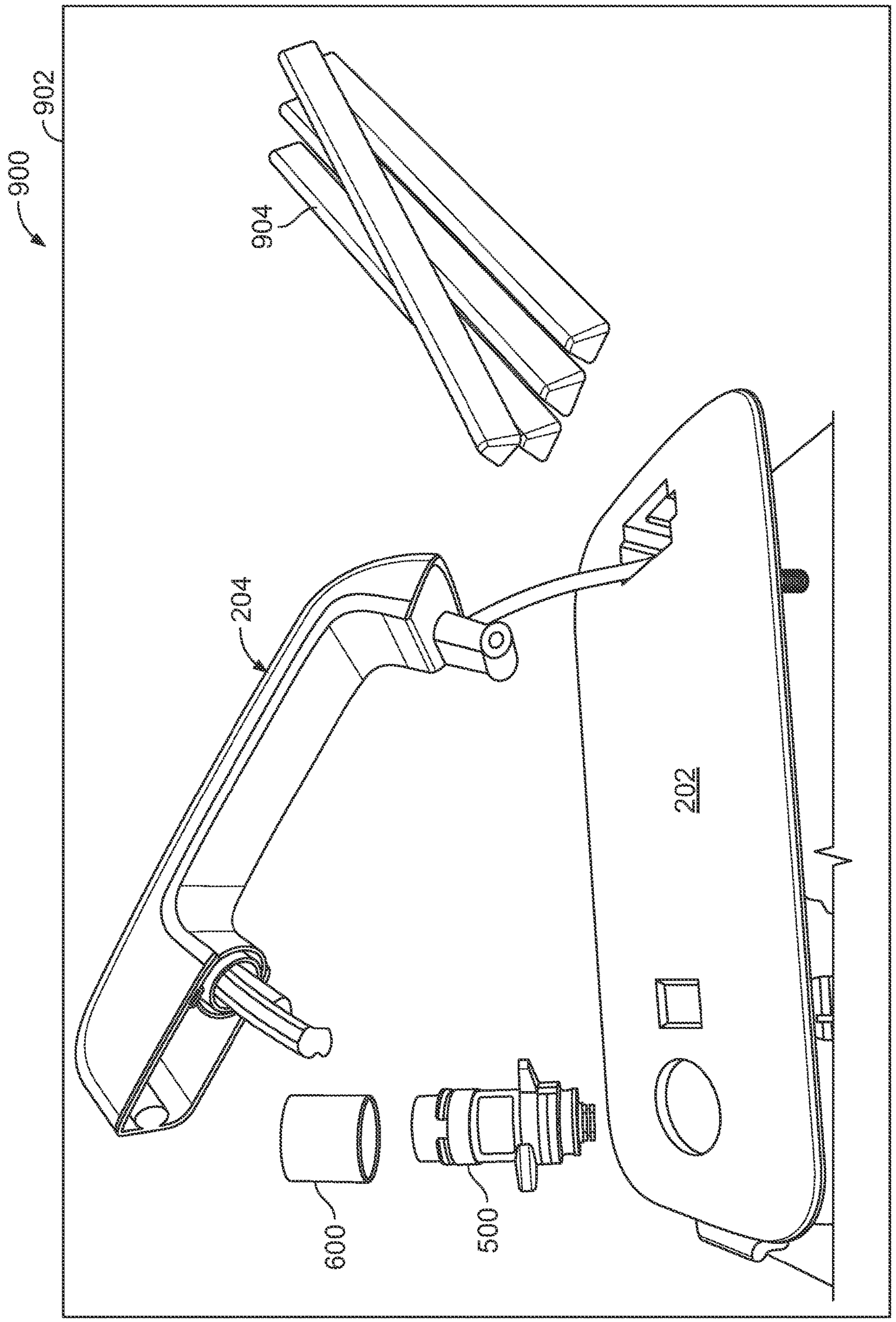
FIG. 9 is a schematic illustration of another example implementation of a kit-of-parts for a vehicle door handle assembly according to the present disclosure.

FIG. 9 is a schematic illustration of another example implementation of a kit-of-parts for a vehicle door handle assembly according to the present disclosure. For example, as shown in this figure, a kit-of-parts 900 for the door handle assembly 200 can include at least one container 902 to hold the components of the kit-of-parts 900 (e.g., for shipment or storage or otherwise). The container 902 can be, for instance, a box, envelope, bag, or other container sized to hold the components. In this example, the kit-of-parts 900 includes the sleeve 600. Optionally, the kit-of-parts 900 can include a portion of a material 904 that can be used to form a material deposition layer 705 or 710 as previously described. For instance, the material 904 can be welding filler material, soldering filler material, brazing filler material, or an adhesive material. Optionally, the kit-of-parts 900 can further include the door handle assembly 200, itself, such as the panel assembly 202, the handle 204, and the door lock 500. In some aspects, however, the door handle assembly 200 may be provided separately from the kit-of-parts 900.

Figure 10:
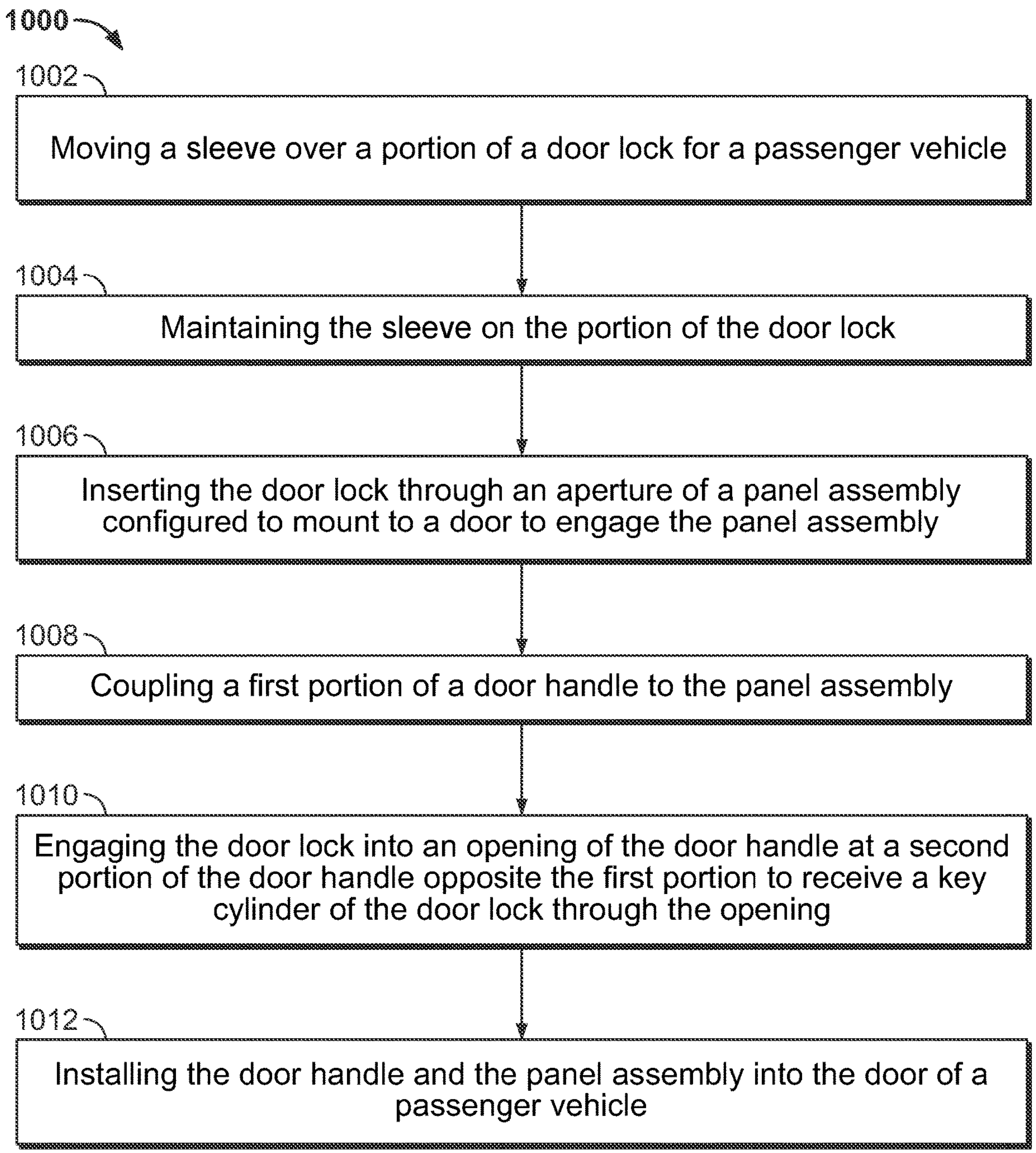
FIG. 10 is a flowchart that illustrates an example implementation of a process for assembling a vehicle door handle assembly with a cabin security apparatus according to the present disclosure.

FIG. 10 is a flowchart that illustrates an example implementation of a process 1000 for assembling a vehicle door handle assembly with a cabin security apparatus according to the present disclosure. In some aspects, the process 1000 can be implemented with the door handle assembly 200 as described herein, as well as an example implementation of the vehicle cabin security apparatus described in the present disclosure. Process 1000 can begin at step 1002, which includes moving a sleeve over a portion of a door lock for a passenger vehicle. For example, the sleeve 600 can be moved over the lock stem 504 (and over the key cylinder 506) of the door lock 500. In some aspects, the sleeve 600 can be oved to abut the shoulder 505 of (or be adjacent to) the door lock 500. The sleeve 600 can be sized (e.g., radially) so as to provide clearance between the inner diameter of the sleeve 600 and the outer diameter of the lock stem 504. Further, in some aspects, the sleeve 600 can be sized (e.g., axially) to match or substantially match an axially length of the lock stem 504 of the door lock 500.

Process 1000 can continue at step 1004, which includes maintaining the sleeve on the portion of the door lock. For example, in some aspects, the snap ring 700 can be positioned on the door lock 500 and prevent or help prevent the sleeve 600 from sliding from the lock stem 504 (or other portion of the door lock 500, as appropriate) onto the key cylinder 506 or off the door lock 500 altogether. The snap ring 700 can be manipulated by, for example, the snap ring pliers 804 to stretch the terminal ends 701 apart (away from each other) to position the snap ring 700 about the key cylinder 506. The snap ring 700 can then be positioned adjacent to or abutting the shoulder 507 of the lock stem 504. Upon release of the terminal ends 701 with the pliers 804, the snap ring 700 is radially biased to grip the key cylinder 506 and maintain its position thereon.

As another example, the sleeve 600 can be maintained by applying material deposition layer 705 as a ring or tacks on the key cylinder 506 as shown in FIGS. 7C and 7D. The material deposition layer 705 can also be close to or abut the shoulder 507 (in some examples) to prevent or help prevent the sleeve 600 from moving off of the lock stem 504 of the door lock 500. As previously described, if the material deposition layer 705 acts to connect or attach the sleeve 600 to the door lock 500 (such as to the key cylinder 506), the force or torque necessary to break the connection (thereby allowing the sleeve 600 to move about the lock stem 504) can be less than the force or torque necessary to break at least a part of the door handle assembly 200 (such as the back panel 220) to undesirably unlock the door handle assembly 200.

As yet another example, the sleeve 600 can be maintained by applying material deposition layer 710 as a ring or tacks on the lock stem 504 as shown in FIGS. 7E and 7F. The material deposition layer 705 can act to connect or attach the sleeve 600 to the door lock 500 (such as to the lock stem 504). But as described, a force or torque necessary to break the connection (thereby allowing the sleeve 600 to move about the lock stem 504) can be less than the force or torque necessary to break at least a part of the door handle assembly 200 (such as the back panel 220) to undesirably unlock the door handle assembly 200.

In some aspects, the sleeve 600 is maintained on the portion of the door lock 500 (such as on the lock stem 504) without the snap ring 700 or the material deposition layers 705 or 710. For example, an end of the sleeve 600 can be flared or crimped in order to prevent sliding off of the door lock 500. As another example, an axially length of the sleeve 600 can be chosen so that, when installed on the door lock 500 and with the door lock 500 installed in the door handle assembly 200, the sleeve 600 is maintained on the lock stem 504.

Process 1000 can continue at step 1006, which includes inserting the door lock through an aperture of a panel assembly configured to mount to a door to engage the panel assembly. For example, the door lock 500 including the sleeve 600 (maintained on the lock stem 504), can be inserted through opening 222 to engage with the back panel 220 (with the lock assembly 502 engaging with the slots 224. The door lock 500 (including the sleeve 600 and snap ring 700 or material deposition layers 705 or 710, if necessary), extend from the opening 222 of the panel assembly 202.

Process 1000 can continue at step 1008, which includes coupling a first portion of a door handle to the panel assembly. For example, the pivot end 212 of the handle 204 can engage with the panel assembly 202.

Process 1000 can continue at step 1010, which includes engaging the door lock into an opening of the door handle at a second portion of the door handle opposite the first portion to receive a key cylinder of the door lock through the opening. For example, the door lock 500 (and sleeve 600) can be inserted into an opening 215 (shown in FIG. 2F) so that the keyhole 511 is exposed through the key opening 206.

Process 1000 can continue at step 1012, which includes installing the door handle and the panel assembly into the door of a passenger vehicle. For example, the door handle assembly 200 can be installed in, for example, the driver door 105 or 155 of passenger vehicle 100 or passenger vehicle 150, respectively, (or another passenger vehicle according to the present disclosure). In some aspects, the door handle assembly 200 is only installed in the driver door 105 or driver door 155, rather than a non-driver door.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A passenger vehicle door handle assembly, comprising:

a door lock configured to adjust a door of a passenger vehicle between a locked position and an unlocked position, the door lock comprising a lock assembly, a lock stem, and a key cylinder that extends from the lock stem;

a panel assembly configured to mount to the door, the panel assembly comprising a front panel portion and a back panel coupled to the front panel portion, the back panel comprising an aperture sized and configured to receive at least the lock assembly of the door lock into a slotted portion of the back panel;

a door handle comprising a first portion configured to pivotally couple to the panel assembly at a first end of the panel assembly, and a second portion comprising an opening configured to receive at least the lock stem of the door lock, the door handle rotatable about the first portion pivotally coupled to the panel assembly at the first end of the panel assembly in the locked position to expose the lock stem from the second portion of the door handle through the opening;

a sleeve sized to fit over the lock stem and configured to rotate about the lock stem in response to an external torque applied to the sleeve, the sleeve including a substantially constant inner opening dimension from a first end of the sleeve to a second end of the sleeve and configured to decouple the external torque applied to the sleeve from the lock stem to limit the external torque from being applied to the panel assembly through the lock stem sufficient to break the panel assembly by rotation of the lock stem exposed from the second portion of the door handle in response to the external torque, the lock stem rotatable within the sleeve in response to rotation of a key in the key cylinder to adjust the door between the locked position and the unlocked position; and a ring member configured to fit over at least a portion of the door lock and adjacent the first end of the sleeve to maintain the second end of the sleeve at a particular position on the door lock.

2. The passenger vehicle door handle assembly of claim 1, wherein the lock stem is insertable into the opening to expose a keyhole of the lock stem from the door handle, and the sleeve is configured to insert into the opening over the lock stem.

3. The passenger vehicle door handle assembly of claim 1, wherein the ring member comprises a snap ring configured to fit over at least the portion of the door lock and adjacent the first end of the sleeve to maintain the second end of the sleeve at the particular position on the door lock.

4. The passenger vehicle door handle assembly of claim 3, wherein the snap ring comprises a split snap ring.

5. The passenger vehicle door handle assembly of claim 3, wherein the snap ring is biased to engage the portion of the door lock.

6. The passenger vehicle door handle assembly of claim 3, wherein the sleeve is sized to fit over the lock stem so that the second end terminates at a shoulder of the lock assembly.

7. The passenger vehicle door handle assembly of claim 6, wherein the snap ring is configured to fit over the key cylinder and maintain the sleeve on the lock stem.

8. The passenger vehicle door handle assembly of claim 6, wherein the door handle is configured to pivot at the first portion to retract the second portion away from the front panel and expose the sleeve from the opening of the second portion of the door handle without exposing the lock stem of the door lock.

9. The passenger vehicle door handle assembly of claim 1, wherein the ring member comprises a material deposition layer applied to at least the portion of the door lock adjacent the first end of the sleeve and configured to maintain the second end of the sleeve at the particular position on the door lock.

10. The passenger vehicle door handle assembly of claim 9, wherein the material deposition layer comprises at least one of a weld deposition layer, a solder deposition layer, or a brazed deposition layer configured to maintain, when applied, the sleeve at the particular position on the lock stem.

11. The passenger vehicle door handle assembly of claim 9, wherein the material deposition layer comprises a whole ring applied to the door lock.

12. The passenger vehicle door handle assembly of claim 9, wherein the sleeve is sized to fit over the lock stem and abut a shoulder of the lock assembly.

13. The passenger vehicle door handle assembly of claim 12, wherein the material deposition layer is applied to the key cylinder and is configured to maintain the sleeve on the lock stem.

14. The passenger vehicle door handle assembly of claim 12, wherein the material deposition layer is applied to the lock stem between the lock stem and the sleeve and is configured to adhere the sleeve to the lock stem.

15. The passenger vehicle door handle assembly of claim 14, wherein the material deposition layer comprises an adhesive material.

16. The passenger vehicle door handle assembly of claim 1, wherein the opening of the second portion of the door handle is configured to receive at least part of the sleeve.

17. The passenger vehicle door handle assembly of claim 1, wherein the sleeve comprises a cylinder.

18. The passenger vehicle door handle assembly of claim 1, wherein the sleeve comprises a split cylinder.

19. The passenger vehicle door handle assembly of claim 1, wherein the sleeve has a polygonal cross-section.

20. The passenger vehicle door handle assembly of claim 1, wherein the sleeve is at least partially made from a metallic material.

21. The passenger vehicle door handle assembly of claim 20, wherein the metallic material comprises stainless steel, galvanized steel, or aluminum.

22. The passenger vehicle door handle assembly of claim 1, wherein the door lock comprises a keyed door lock.

23. The passenger vehicle door handle assembly of claim 1, wherein the door is a driver door.

24. The passenger vehicle door handle assembly of claim 1, wherein the passenger vehicle is a passenger truck.

25. The passenger vehicle door handle assembly of claim 24, wherein the passenger truck is a Ford® F-150, a Ford® F-250, or a Ford® F-350.

26. The passenger vehicle door handle assembly of claim 1, wherein the passenger vehicle is a sports utility vehicle (SUV).

27. The passenger vehicle door handle assembly of claim 26, wherein the SUV is a Ford® Explorer or a Ford® Expedition.

28. A passenger vehicle door handle assembly, comprising:

a door lock configured to adjust a door of a passenger vehicle between a locked position and an unlocked position, the door lock comprising a lock assembly and a lock stem;

a panel assembly configured to mount to the door, the panel assembly comprising a front panel portion and a back panel coupled to the front panel portion, the back panel comprising an aperture sized and configured to receive at least the lock assembly of the door lock into a slotted portion of the back panel;

a door handle comprising a first portion configured to pivotally couple to the panel assembly at a first end of the panel assembly, and a second portion comprising an opening configured to receive at least the lock stem of the door lock, the door handle rotatable about the first portion pivotally coupled to the panel assembly at the first end of the panel assembly in the locked position to expose the lock stem from the second portion of the door handle through the opening;

a sleeve including a substantially constant inner opening dimension and a length substantially equal to a length of the lock stem and carried on the lock stem to move about the lock stem and decouple a torque applied to the sleeve from the lock stem, while permitting rotation of the lock stem within the sleeve in response to adjustment of the door lock between the locked position and the unlocked position, and limit the torque transmitted to the back panel through the sleeve and the lock stem to no more than a specified breaking force of the back panel; and a snap ring sized to fit over at least a portion of the door lock and adjacent an end of the sleeve to maintain the sleeve substantially covering the lock stem.

29. A passenger vehicle door handle assembly, comprising:

a door lock configured to adjust a door of a passenger vehicle between a locked position and an unlocked position, the door lock comprising a lock assembly and a lock stem;

a panel assembly configured to mount to the door, the panel assembly comprising a front panel portion and a back panel coupled to the front panel portion, the back panel comprising an aperture sized and configured to receive at least the lock assembly of the door lock into a slotted portion of the back panel;

a door handle comprising a first portion configured to pivotally couple to the panel assembly at a first end of the panel assembly, and a second portion comprising an opening configured to receive at least the lock stem of the door lock, the door handle rotatable about the first portion pivotally coupled to the panel assembly at the first end of the panel assembly in the locked position to expose the lock stem from the second portion of the door handle through the opening;

a cylindrical sleeve having a constant inner diameter and sized to fit over a length of the lock stem of the door lock and configured to rotate about the lock stem in response to an external torque applied to the sleeve exclusive of passing the external torque, through the lock stem to the back panel assembly, that is sufficient to break the back panel assembly; and a snap ring sized to fit over at least a portion of the door lock and adjacent an end of the cylindrical sleeve to maintain the cylindrical sleeve on the lock stem, wherein the cylindrical sleeve is configured to allow rotation of the lock stem within the cylindrical sleeve in response to adjustment of the door lock from the locked position to the unlocked position with a key inserted into the door lock.

30. A passenger vehicle door handle assembly, comprising:

a door lock configured to adjust a door of a passenger vehicle between a locked position and an unlocked position, the door lock comprising a first part and a second part;

a panel assembly configured to mount to the door, the panel assembly comprising a front panel portion and a back panel coupled to the front panel portion, the back panel comprising an aperture sized and configured to receive at least the first part of the door lock into a contoured recess of the back panel;

a door handle comprising a first portion configured to pivotally couple to the panel assembly at a first end of the panel assembly, and a second portion comprising an opening configured to receive at least the second part of the door lock, the door handle rotatable about the first portion pivotally coupled to the panel assembly at the first end of the panel assembly in the locked position to expose the lock stem from the second portion of the door handle through the opening;

a sleeve carried on the second part to move about the second part and decouple a force or a torque applied to the sleeve from the second part of the door handle; and a ring sized to fit over at least a portion of the door lock and adjacent an end of the cylindrical sleeve to maintain the cylindrical sleeve on the lock stem, wherein the sleeve is configured to allow rotation of the lock stem within the cylindrical sleeve in response to adjustment of the door lock.

* * * * *